US008613807B2

(12) United States Patent
Horie et al.

(10) Patent No.: US 8,613,807 B2
(45) Date of Patent: Dec. 24, 2013

(54) CONDUCTIVE FILM, CORROSION-RESISTANT CONDUCTION FILM, CORROSION-RESISTANT CONDUCTION MATERIAL AND PROCESS FOR PRODUCING THE SAME

(75) Inventors: Toshio Horie, Seto (JP); Gaku Kitahara, Aichi-gun (JP); Nobuaki Suzuki, Nisshin (JP); Fumio Shimizu, Toyota (JP); Takao Kobayashi, Seto (JP); Ken-ichi Suzuki, Nagoya (JP); Shigeki Oshima, Obu (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 240 days.

(21) Appl. No.: 12/656,459

(22) Filed: Jan. 29, 2010

(65) Prior Publication Data

US 2010/0200120 A1 Aug. 12, 2010

(30) Foreign Application Priority Data

Feb. 6, 2009 (JP) ................................ 2009-025699
Jun. 26, 2009 (JP) ................................ 2009-153034
Jun. 26, 2009 (JP) ................................ 2009-153035

(51) Int. Cl.
*C23C 8/00* (2006.01)
*B32B 9/00* (2006.01)
*H01B 1/02* (2006.01)

(52) U.S. Cl.
USPC ........... 148/237; 428/698; 428/697; 428/701; 148/238; 252/521.2; 252/520.22

(58) Field of Classification Search
USPC ........................... 428/697, 698, 701; 148/237
See application file for complete search history.

(56) References Cited

U.S. PATENT DOCUMENTS 5,518,516 A 5/1996 Garnham
5,518,556 A 5/1996 Weber et al.

(Continued)

FOREIGN PATENT DOCUMENTS

JP A-49-9438 1/1974
JP A-63-48365 3/1988

(Continued)

OTHER PUBLICATIONS

Lewkebandara et al. "Precursor for the Low-Temperature Deposition of Titanium Phosphide Films", Chem. Mater. 1995, 7, 1053-1054.*

(Continued)

*Primary Examiner* — Rebecca Lee
(74) *Attorney, Agent, or Firm* — Oliff & Berridge, PLC

(57) ABSTRACT

A conductive film comprises a phosphide particle coated film formed by attaching raw material particles including phosphide particles comprising a compound of Ti and/or Fe, and P to a surface of a substrate material. This conductive film exhibits good corrosion resistant conductivity, and can be easily formed at low costs because of comprising the phosphide particle coated film. A corrosion-resistant conduction film comprises an iron-containing titanium phosphide layer containing Ti, Fe and P as essential basic elements. A corrosion-resistant conduction material having this corrosion-resistant conduction film on a surface of a substrate exhibits good corrosion resistance or conductivity. This corrosion-resistant conduction material can be obtained, for example, by a process comprising a plating step of forming an Ni plating layer on a surface of a Ti-based material substrate and a nitriding step of applying nitriding treatment to the Ti-based material substrate after the plating step at not more than 880 deg. C.

16 Claims, 9 Drawing Sheets

(56) References Cited

U.S. PATENT DOCUMENTS

| | | | | |
|---|---|---|---|---|
| 6,967,065 | B1 | 11/2005 | Saitou et al. | |
| 2005/0156167 | A1* | 7/2005 | Kiyohara et al. | 257/53 |
| 2007/0210429 | A1* | 9/2007 | Lin et al. | 257/678 |
| 2007/0262403 | A1* | 11/2007 | Tsurume | 257/428 |
| 2009/0202736 | A1 | 8/2009 | Horie et al. | |

FOREIGN PATENT DOCUMENTS

| | | |
|---|---|---|
| JP | A-6-346222 | 12/1994 |
| JP | A-2000-123850 | 4/2000 |
| JP | A-2000-164228 | 6/2000 |
| JP | A-2000-353531 | 12/2000 |
| JP | A-2002-508450 | 3/2002 |
| JP | A-2003-513141 | 4/2003 |
| JP | A-2004-273370 | 9/2004 |
| JP | A-2004-288419 | 10/2004 |
| JP | A-2005-264235 | 9/2005 |
| JP | A-2005-336551 | 12/2005 |
| JP | A-2007-23317 | 2/2007 |
| JP | A-2007-239004 | 9/2007 |
| JP | A-2008-183523 | 8/2008 |
| JP | A-2008-285731 | 11/2008 |
| WO | WO 02/061175 A1 | 8/2002 |

OTHER PUBLICATIONS

Czarnowska et al. "Composite Layer with a Ti3P External Zone Produced on Titanium Alloy for Bone Applications", Advances in Science and Technology, 2006, 49, 240-245.*

Aug. 2, 2011 Notification of Reasons for Refusal issued in corresponding Japanese Patent Application No. 2009-025699 (with translation).

Nov. 1, 2011 Notification of Reasons for Refusal issued in corresponding Japanese Patent Application No. 2009-153035 (with translation).

Surface Finishing Society of Japan, "Hyomen Gijutsu Binran," Nikkan Kogyo Shimbun Ltd., Feb. 27, 1998, First Edition, p. 662 (with partial translation).

Office Action issued in Japanese Patent Application No. 2009-153034 dated Jul. 12, 2011 (with translation).

* cited by examiner

CONDUCTIVE FILM, CORROSION-RESISTANT CONDUCTION FILM, CORROSION-RESISTANT CONDUCTION MATERIAL AND PROCESS FOR PRODUCING THE SAME

BACKGROUND OF THE INVENTION

1. Field of the Invention

The present invention relates to a conductive film having at least good electric conductivity, a corrosion-resistant conduction film having at least one of good corrosion resistance and good electric conductivity, a corrosion-resistant conduction material having one of these films on a surface thereof, and a process for producing the same.

2. Description of the Related Art

Nowadays, there is a demand for members exhibiting high conductivity stably even in a corrosive environment, as exemplified by metal bipolar plates for a polymer electrolyte fuel cell. However, it is not easy to obtain conductive members (current-carrying elements/electrical conductive materials) having corrosion resistance on an industrial scale at which a variety of requirements must be satisfied. For example, a Ti-based or stainless steel-based metallic material forms a strong and stable passive film on a surface thereof and exhibits its good corrosion resistance. However, since the passive film comprises a stable insulating chemical compound, generally the passive film has a very high electric resistance and poor conductivity. Under these circumstances, various proposals including those described in the following patent documents have been made in order to obtain an electrical conductive material of practical use.

Patent Document 1: Japanese Unexamined Patent Publication (KOKAI) No. 2005-336551

Patent Document 2: Japanese Unexamined Patent Publication (KOKAI) No. 2004-273370

Patent Document 3: Japanese Unexamined Patent Publication (KOKAI) No. 2000-353531

Patent Document 4: Japanese Unexamined Patent Publication (KOKAI) No. 2000-123850

Patent Document 1 proposes to apply heat treatment to a Ti material to form an Fe-rich phase, thereby improving corrosion resistance of the Ti material. Patent Document 1, however, does not show any description about conductivity of the Ti material. Besides, formation of such an Fe-rich phase requires complex thermo-mechanical treatment.

Patent Document 2 proposes a bipolar plate comprising a titanium-based material substrate (Ti-based material substrate) in which TiB-based boride particles are precipitated. This bipolar plate secures corrosion resistance by a passive film formed on the base material and exhibits conductivity by a boride precipitated on a surface thereof. However, because the boride is very hard, this bipolar plate is poor in rolling or forming characteristics. It is true that if the amount of the boride dispersed is reduced, rolling or forming characteristics is improved, but conductivity is reduced. In addition, there is a possibility that corrosion will extend from portions from which the boride particles are detached.

Patent Document 3 proposes a bipolar plate in which a metal nitride layer is formed on a surface of a Ti-based material substrate. The present inventors' constant potential experiment revealed that it is true that contact resistance before a constant potential corrosion test is decreased but contact resistance after the constant potential corrosion test is greatly increased.

Patent Document 4 proposes a bipolar plate in which a chemically stable noble metal plating layer is provided on a base material comprising a stainless steel, a titanium alloy or the like. However, the use of such a noble metal results in high costs. If the amount of noble metal used is reduced, there is a possibility that adhesiveness will be damaged or the plating layer will be detached. In addition, when the base material is Al or the like, there is also a possibility that a local cell will be formed at a pin hole portion of the plating layer and as a result local corrosion such as pitting corrosion may occur.

SUMMARY OF THE INVENTION

The present invention has been made in view of these circumstances. It is an object of the present invention to provide a conductive film which can be formed at relatively low costs and exhibits good electric conductivity, a corrosion-resistant conduction film which exhibits at least one of good corrosion resistance and good conductivity, a corrosion-resistant conduction material having one of these films on a surface of a base material, and a process for producing the same.

A. Electric Conductive Film (1) A conductive film of the present invention comprises a phosphide particle layer formed by attaching raw material particles including phosphide particles comprising a chemical compound of at least one of Ti and Fe, and P to a surface of a base material, and thereby has at least good conductivity.

(2) The conductive film of the present invention exhibits remarkably better conductivity than the conventional films. This conductivity can be stably exhibited even in a corrosive environment. Besides, since the conductive film of the present invention is formed at relatively low costs, the conductive film of the present invention has a high possibility of being practically used in a variety of fields, namely, a high industrial utility.

By the way, even if the phosphide particles are in a dispersed state (a dotted state), in other words, the phosphide particle are not formed in a continuous film state (a dense state), the phosphide particle layer of the present invention can exhibit very good conductivity. That is to say, even if the phosphide particle layer has a substantially small contact area with a substrate (effective electrode area), the conductive film of the present invention exhibits sufficiently high conductivity. This suggests that the phosphide particles in themselves (or their modified particles in themselves) constituting the phosphide particle layer have remarkably high conductivity. Besides, this high conductivity can be stably maintained even in a severe corrosive environment. However, detailed mechanism of why the phosphide particles or the phosphide particle layer have good conductivity and corrosion resistance is not entirely clear at present.

(3) It is assumed that the phosphide particle layer exhibits high conductivity because at least part of the phosphide particles are exposed to an outermost surface or come to be exposed to the outermost surface during the use of the conductive film. Components of the phosphide particle layer other than the phosphide particles, the volume ratio of the phosphide particles in the phosphide particle layer, particle size of the phosphide particles, thickness of the phosphide particle layer, the ratio of thickness of the phosphide particle layer to particle size of the phosphide particles and so on can be adjusted appropriately.

It should be noted that in the phosphide particle layer of the present invention, the phosphide particles, which constitute a base of the phosphide particle layer, may remain as it was at the beginning or may be changed. It is assumed that this change of the phosphide particles occurs, for example, when the phosphide particles as a raw material react with the substrate material (member), aftertreatment such as nitriding treatment changes composition or structure, and an atmosphere used affects the phosphide particles.

The conductive film, the phosphide particle layer and the phosphide particles of the present invention have not only good conductivity but also good corrosion resistance, but are not always required to have good corrosion resistance, as long as they have good conductivity. For example, the conductive film of the present invention can specialize only in conductivity.

The phosphide particle layer mentioned in the present invention can have a multilayer structure. For example, the phosphide particle layer can be constituted by a plurality of layers having different amounts and compositions of phosphide particles dispersed. Moreover, the phosphide particle layer can be a layer in which distribution of the amount or composition of phosphide particles dispersed shows a graded variation. Furthermore, the conductive film can also have a multilayer structure. For example, the conductive film can further comprise a supporting layer for supporting the phosphide particle layer. Examples of such a supporting layer include a titanium nitride film, a titanium phosphide film and an iron-titanium phosphide film.

<Electrical Conductive Material>

(1) The present invention can be grasped not only as a conductive film but also a conductive material in which the conductive film is formed on a surface of a substrate material. That is to say, the present invention can be a conductive material comprising a substrate material and the conductive film of the present invention formed on a surface of the substrate.

(2) The substrate material mentioned in the present invention is not limited in material, shape, size or the like. For example, the substrate can be a member of a predetermined shape, an intermediate product to be processed or shaped, powder, or the like. Therefore, the conductive material mentioned in the present invention can include not only a member but also an intermediate product or a raw material (including powder) which has the conductive film of the present invention.

Moreover, as long as the conductive film of the present invention is formed, a base (a core portion) of the base material can be not only metal such as Ti, Al, Fe (including stainless steel) and Mg, but also resin, ceramic or the like. Since the conductive film of the present invention can be formed as a coated film which holds phosphide particles in a dispersed state, particularly the conductive film of the present invention is applicable to various kinds of base materials other than metal.

<Process for Producing Conductive Material (Process for Forming Conductive Film)>

The conductive film, the conductive material or the like of the present invention is not limited in its formation or production processes. For example, formation of the conductive film or production of the conductive material is possible by the following prodess. A process for producing a conductive material will be described as a typical example, but this process can be similarly grasped as a process for forming a conductive film.

(1) That is to say, the conductive material can also be obtained by a production process comprising an attaching step of attaching raw material particles including phosphide particles comprising a chemical compound of at least one of Ti and Fe, and P to a surface of a base material and thereby obtaining the above-mentioned conductive material of the present invention.

(2) The conductive film of the present invention only requires that a phosphide particle layer formed by attaching phosphide particles to a surface of a base material exhibits conductivity. Therefore, in the present invention, a conductive film can be formed by the abovementioned attaching step, without applying such surface treatment as in the conventional processes.

<Conductive Powder>

The present invention can also be grasped not only as the abovementioned conductive film and so on but also as conductive powder including phosphide particles, which is useful to form the abovementioned conductive film. That is to say, the present invention can be conductive powder comprising phosphide particles comprising a chemical compound of at least one of Ti and Fe, and P, thereby having at least good conductivity.

<Process for Producing Conductive Powder>

Such conductive powder can be obtained, for example, by the following process.

(1) That is to say, the conductive powder can also be obtained by a production process comprising a mixing step of obtaining mixed powder of phosphide powder and metal powder, and a hardening step of obtaining cured powder by curing the mixed powder, and thereby obtaining the abovementioned conductive powder of the present invention.

(2) It is suitable that a process for producing conductive powder comprises a powder nitriding step of nitriding raw material powder including phosphide powder.

<Modifying Element>

The conductive film (particularly the phosphide particle layer) of the present invention can include "a modifying element" which improves or does not adversely affect characteristics of the conductive film, in addition to at least one of Ti and Fe, and P (hereinafter referred to as "essential basic elements"). Furthermore, the conductive film of the present invention is permitted to contain "inevitable impurities" in addition to the modifying element.

Inevitable impurities are elements which are difficult to be removed for cost or technical reasons. Such inevitable impurities may be not only contained in or attached to the very phosphide particles but also be inevitably mixed in forming a conductive film. In the present invention; however, there are cases where even elements which are regarded as inevitable impurities from the viewpoint of a base material are not inevitable impurities from the viewpoint of a very conductive film (especially a phosphide particle layer). For example, an inevitable impurity element of a base material can be a modifying element or an essential element of a phosphide particle layer. There is a possibility that such an element is taken into a side of the phosphide particle layer (or phosphide particles) from a side of the base material. In such a case, advantageously a good conductive material is obtainable in spite of the use of a relatively inexpensive base material of a low purity. An example of such an element is Fe, which is contained as an impurity element in a titanium-based alloy.

(2) Examples of an arbitrarily contained element such as a modifying element include N, B, Ni, Cr, Co, Mn, Al, rare earth elements (Sc, Y, lanthanoid) and actinoid. Examples of inevitable impurities include Li, Na, Mg, K, Ca, V, Ni, Cu, O and Cl. These elements can be contained similarly in the present application.

B. Corrosion-Resistant Conduction Film (1) The corrosion-resistant conduction film of the present invention comprises an iron-containing titanium phosphide layer comprising Ti, Fe and P, and is formed on a surface of a substrate and exhibits at least one of good corrosion resistance and good conductivity.

(2) The corrosion-resistant conduction film of the present invention exhibits remarkably better corrosion resistance or conductivity than the conventional films. In addition, because of its relatively low costs, the corrosion-resistant conduction film of the present invention has a high possibility of being practically used in a variety of fields, namely, a high industrial utility. By the way, the reason why the corrosion-resistant conduction film of the present invention has good corrosion resistance and/or good conductivity is assumed that the iron-containing titanium phosphide layer, which constitutes the corrosion-resistant conduction film, has good chemical stability and great electric (electronic) conductivity. However, though constituent elements of the iron-containing titanium phosphide layer have been identified, the reason why the iron-containing titanium phosphide layer has good chemical stability and good electric conductivity is not entirely clear at present.

(3) Corrosion resistance and conductivity of the corrosion-resistant conduction film of the present invention can satisfy users' demand simultaneously at high levels. However, the corrosion-resistant conduction film of the present invention can be specialized in only one of corrosion resistance and conductivity. For example, in accordance with required specifications of a film or a member, only one of corrosion resistance and conductivity can be enhanced in priority to the other by appropriately changing composition or forming process of the film.

(4) Moreover, if the iron-containing titanium phosphide layer according to the present invention has a shape of a film extending over a desired area, contact area with a substrate (effective electrode area) is increased and contact resistance is reduced, when compared with those having a shape of dispersed conductive particles.

<Corrosion-Resistant Conduction Material>

(1) The present invention can be grasped not only as a corrosion-resistant conduction film but also as a corrosion-resistant conduction material in which the corrosion-resistant conduction film is formed on a surface of a substrate. That is to say, the present invention can be a corrosion-resistant conduction material comprising a substrate and the corrosion-resistant conduction film of the present invention formed on a surface of the substrate.

(2) The substrate mentioned herein is also not limited in material, shape, size or the like, as mentioned above. A base (a core portion) of the substrate can be a variety of materials similarly to the above. However, it is suitable that the substrate material in itself comprises a material having good corrosion resistance such as pure titanium, a titanium alloy and stainless steel, because the corrosion-resistant conduction film is easily formed. For example, it is convenient that the substrate is a Ti-based material substrate comprising pure titanium or a titanium alloy, because the base material can be a supply source of Ti, which is one of the essential basic elements of the iron-containing titanium phosphide layer.

<Process for Producing Corrosion-Resistant Conduction Film or Corrosion-Resistant Conduction Material>

(1) The corrosion-resistant conduction film, the corrosion-resistant conduction material or the like of the present invention is not limited in its formation or production processes. For example, formation of the corrosion-resistant conduction film or production of the corrosion-resistant conduction material is possible by the following process. A process for producing a corrosion-resistant conduction material will be described as a typical example, but this process can be similarly grasped as a process for forming a corrosion-resistant conduction film.

The corrosion-resistant conduction material can also be obtained by a production process comprising a contacting step of contacting at least part of a Ti-based material substrate comprising pure titanium or a titanium alloy with a treatment material comprising Fe-containing phosphate, and a removing step of removing the treatment material from the Ti-based material substrate after the contacting step and thereby obtaining the abovementioned corrosion-resistant conduction material.

(2) The treatment material can be liquid such as molten salt, an aqueous solution and a plating solution, or powder. The contacting step can be, for example, a step of applying a treatment liquid comprising Fe-containing phosphate to a Ti-based material substrate by coating, spraying or dipping, or a step of coating a Ti-based material substrate with treatment powder comprising Fe-containing phosphide.

<Modifying Element>

Also the corrosion-resistant conduction film can include "a modifying element" which improves or does not adversely affect characteristics of the corrosion-resistant conduction film, in addition to Ti, Fe and P. Furthermore, the corrosion-resistant conduction film can contain "inevitable impurities" in addition to the modifying element. In some cases, an impurity element of a base material can be an element effective for improving characteristics of the corrosion-resistant conduction film, and in other cases an impurity element of a base material can be an essential element of the iron-containing titanium phosphide layer. For example, Fe, which is an impurity element of a Ti-based material substrate, is an essential constituent element of the corrosion-resistant conduction film. This means that even when a relatively inexpensive substrate material of a low purity is used, a corrosion-resistant conduction material having very good characteristics can be obtained. Other characteristics are similar to those of the abovementioned conductive film.

C. Corrosion-Resistant Conduction Material

The corrosion-resistant conduction material of the present invention comprises a substrate material, and a corrosion-resistant conduction film formed on a surface of the substrate and having at least one of good corrosion resistance and conductivity, and the corrosion-resistant conduction film is a titanium phosphide film.

<Process for Producing Corrosion-Resistant Conduction Material>

The corrosion-resistant conduction material of the present invention is not limited in its production process or the like. For example, formation of the corrosion-resistant conduction film or production of the corrosion-resistant conduction material is possible by the following process.

(1) The corrosion-resistant conduction material can also be obtained by a production process comprising a plating step of forming a plating layer on a surface of a Ti-based material substrate comprising pure titanium or a titanium alloy by dipping at least part of the Ti-based material substrate in a P-containing plating solution, and a nitriding step of applying nitriding treatment to the Ti-based material substrate after the plating step, and thereby forming a titanium phosphide film having at least one of good corrosion resistance and good conductivity on the surface of the Ti-based material substrate and forming a titanium nitride film on a surface of the titanium phosphide film.

(2) Reason and mechanism of why a titanium phosphide film having good corrosion resistance and/or good conductivity is relatively easily formed by this plating process are under research and are not entirely clear at present. In this respect, a possible explanation at present will be made with reference to FIG. 12.

FIG. 12 is an explanatory diagram of the above-mentioned process for producing the corrosion-resistant conduction material. An Ni—P plating layer 21 is formed on a surface of a Ti-based material substrate 19 in the plating step (FIG. 12(I)). Upon introduction of N and heating involved in nitriding in the nitriding step, at the Ni—P plating layer 21 and a surface portion of the Ti-based material substrate 19 on which the Ni—P plating layer 21 is formed, Ti may diffuse and transfer to the Ni—P plating layer 21 and Ni may diffuse and transfer to the Ti-based material substrate 19. As a result, a new composite film 20 can be formed on a surface of the Ti-based material substrate 19. The composite film 20 comprises a titanium phosphide film 22 formed on a substrate side, and a titanium nitride film 23 formed on an opposite side to the substrate (an outermost surface side) (FIG. 12 (II)).

(3) The corrosion-resistant conduction material of the present invention can be obtained by the production process further comprising an oxidizing step of removing the titanium nitride film from the Ti-based material substrate after the nitriding step and forming a Ti—P—O-based film on a surface of the titanium phosphide film in an acidic atmosphere.

For example, the corrosion-resistant conduction material having the composite film 20 is exposed to an atmosphere which is so strongly acidic as to erode the titanium nitride film 23. Then, the titanium nitride film 23 is removed from a surface of the composite film 20 and a surface of the titanium phosphide film 22 is oxidized, thereby forming a new oxide film. Thus, a new composite film 30 can be formed on the surface of the Ti-based material substrate 19. The composite film 30 comprises the titanium phosphide film 22 on the base material side, and a Ti—P—O-based film 33 on the outermost surface side (FIG. 12(III)).

(4) It is preferable that the abovementioned Ni—P plating layer contains 0.5 to 20% by mass of P based on the total mass of the plating layer. It is also preferable that the abovementioned Ni—P plating layer is an Ni—P—Fe plating layer.

D. Process for Producing Corrosion-Resistant Conduction Material (1) A process for producing a corrosion-resistant conduction material of the present invention comprises a plating step of forming an Ni plating layer on a surface of a Ti-based material substrate comprising pure titanium or a titanium alloy by dipping at least part of the Ti-based material substrate in an Ni plating solution containing Ni as a main component, and a nitriding step of applying nitriding treatment to the Ti-based material substrate after the plating step at not more than 880 deg. C., and thereby obtains a corrosion-resistant conduction material having a corrosion-resistant conduction film having at least one of good corrosion resistance and good conductivity on the surface of the Ti-based material substrate.

(2) By controlling treatment temperature in the nitriding step to not more than α-β solid phase transformation temperature of the Ti-based material substrate, specifically, nor more than 880 deg. C., it is possible to obtain a corrosion-resistant conduction material which maintains good characteristics of the Ti-based material substrate and has a favorable corrosion-resistant conduction film on a surface of the Ti-based material substrate.

(3) It is preferable that the corrosion-resistant conduction film contains 3 to 20% by mass of P based on the total mass of the film. Moreover, the abovementioned corrosion-resistant conduction film can contain Fe. Furthermore, the corrosion-resistant conduction film can contain 0.1 to 2% by mass of B based on the total mass of the film.

(4) Reason and mechanism of why good corrosion-resistant conduction film is relatively easily formed by the abovementioned production process are under research and are not entirely clear at present. However, the present inventors' research so far has revealed that it is preferable to use an Ni—P plating solution (including an Ni—P—Fe plating solution) as the Ni plating solution.

When the Ni—P plating solution is used, the concentration of P in this solution is preferably 0.5 to 20% by mass and more preferably 1 to 10% by mass. Furthermore, it is possible to add 0.01 to 0.2 mol/liter of P to the Ni—P plating solution, for example, in a form of sodium hypophosphite. An Ni—P plating layer thus obtained contains 7 to 20% by mass of P based on the total mass of the plating layer.

It should be noted that Ni in the corrosion-resistant conduction material has a possibility of diffusing from the Ni—P plating layer to the Ti-based material substrate and as a result not remaining in the corrosion-resistant conduction film.

E. Polymer Electrolyte Fuel Cell and Bipolar Plate thereof.

It is suitable to use the abovementioned conductive material or the corrosion-resistant conduction material in a typical form as a bipolar plate for a polymer electrolyte fuel cell.

That is to say, in a polymer electrolyte fuel cell comprising a stack of unit cells each comprising a solid polymer electrolyte membrane provided at a center, a fuel electrode provided in contact with one side of the solid polymer electrolyte membrane, an oxidation electrode provided in contact with the other side of the solid polymer electrolyte membrane, and bipolar plates provided on outer sides of the fuel electrode and the oxidation electrode, and generating a direct current by supplying a fuel gas between one of the bipolar plates and the fuel electrode and supplying an oxidant gas between the other of the bipolar plates and the oxidation electrode, it is suitable that the bipolar plates are bipolar plates for a polymer electrolyte fuel cell having the abovementioned conductive film or the corrosion-resistant conduction film on at least part of a surface thereof. In addition, the present invention can be grasped as a polymer electrolyte fuel cell having these bipolar plates.

F. Supplementary Note (1) "Conductivity" mentioned in the present invention includes both a case where a film in itself has a small electric resistance and a case where a film has a small contact resistance upon contact with another conductive material. "Corrosion resistance" includes both acid resistance meaning that corrosion hardly occurs even in an acidic atmosphere or an oxidizing atmosphere (a high potential atmosphere), and oxidation resistance meaning that oxidation hardly occurs even in a high-temperature oxygen atmosphere.

(2) A range "x to y" mentioned in the present invention includes both a lower limit value x and an upper limit value y, unless otherwise specified. Moreover, a new arbitrary numerical range of "a to b" can be constituted by combining arbitrary numerical values included in the range of "x to y".

BRIEF DESCRIPTION OF THE DRAWINGS

The exact nature of this invention, as well as other objects and advantages thereof, will be readily apparent from consideration of the following specification relating to the annexed drawings in which.

IDENTIFICATION OF LETTERS AND NUMERALS

Figure 1:
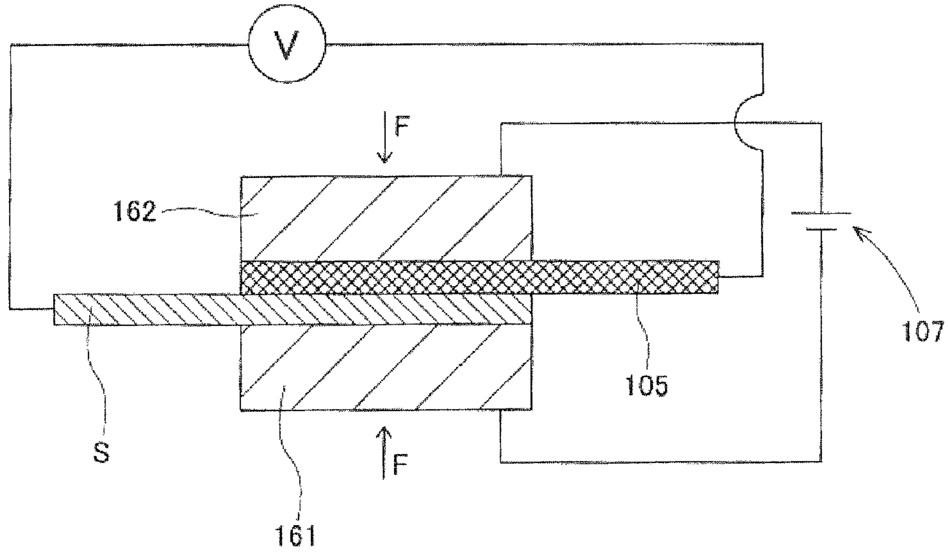
FIG. 1 is a schematic diagram of a contact resistance measuring device.

S: a test specimen, F: a polymer electrolyte fuel cell, 1: a solid polymer electrolyte membrane, 2: a fuel electrode, 3: an oxidation electrode, 5: a bipolar plate, 19: a Ti-based material substrate, 21: an Ni—P plating layer, 22: a $Ti_3P$ film, 23: a TiN film, 33: a Ti—P—O-based film

DESCRIPTION OF THE PREFERRED EMBODIMENTS

The present invention will be described in more detail by way of embodiments. Description in the present application, including those of the following embodiments can apply to the conductive film, the corrosion-resistant conduction film, the corrosion-resistant conduction material, and their production processes according to the present invention. The abovementioned constitution of the present invention can be added with one or more constitutions arbitrarily selected from the constitutions shown below. When production processes are construed as products by processes, constitution of production processes can be constitution of a conductive film, a conductive material, conductive powder, a corrosion-resistant conduction film, a corrosion-resistant conduction material or the like. Which embodiment is the best depends on an intended use, required performance and so on.

A. Conductive Film, etc.

<Conductive Film>

(1) A conductive film comprises a phosphide particle layer comprising at least one of Ti and/or Fe, and P (essential basic elements). This phosphide particle layer can exhibit good conductivity. Therefore, a base material having the phosphide particle layer on a surface thereof (a conductive material) can also exhibit good conductivity.

Contact of this conductive material with a substrate is approximately point contact by way of phosphide particles, so its substantially effective contact area is assumed to be smaller than that of face contact, but its contact resistance is sufficiently small. This suggests that phosphide particles in themselves have a very high conductivity (electric conductivity).

(2) When this conductive film is used, the material of a substrate material is not limited, as mentioned above. However, in order to obtain both conductivity and corrosion resistance at high levels, it is more preferable that the base material comprises a material having good corrosion resistance such as pure titanium, a titanium alloy and stainless steel. The use of such a highly corrosion-resistant base material is particularly effective when a resultant conductive material is used in a corrosive environment.

(3) Formation of a conductive film on a surface of a base material, that is to say, production of a conductive material is achieved by an attaching step of attaching raw material particles including the abovementioned phosphide particles to at least part of a surface of a substrate. Attachment of phosphide particles to a surface of a substrate can be done by a variety of processes. For example, in some cases, a binder or an adhesive agent is used. In other cases, a coating material (including slurry) formed by mixing phosphide particles and coating fluid is applied to a surface of a substrate (a coating step), thereby forming a phosphide particle-dispersed coated film. When a coated film is formed, the phosphide particle layer can be expressed as a phosphide particle-coated film and the conductive film can be expressed as a conductive coated film.

In order to stably fix the raw material particles including the phosphide particles on a surface of a base material, it is preferable that the process further comprises a fixing step of fixing the raw material particles on the surface of the base material by heating the base material after the attaching step. The fixing step can be, for example, a fusing step of fusing the phosphide particles directly to the surface of the base material, or a hardening step of thermosetting or curing resin or the like in the applied coating material.

(4) The kind of coating fluid (including resin, a solvent, a dilute solution, etc.) in forming a coated film is not limited. However, when a coated film having good corrosion resistance is to be formed, it is preferable to use, as coating fluid, a water-soluble anionic coating fluid of a fluorocarbon resin which has good corrosion resistance and is environmentally friendly because of becoming anions in water, for example, "Elecoat Nicelon" produced by Shimizu Co., Ltd.

Moreover, in order to improve corrosion resistance or conductivity, N may be introduced in the phosphide particle layer by applying nitriding treatment. As far as the already formed phosphide particle layer is not damaged, a nitriding step for nitriding a surface of the base material can be carried out after the attaching step, or simultaneously with or after the fixing step. If the nitriding step also serves as the fixing step, it is efficient.

(5) In order to ensure conductivity of the conductive film or the like, the phosphide particles preferably have a particle size (d) of 1 to 100 μm, and more preferably 5 to 50 μm. The phosphide particle layer or the phosphide particle coated film preferably has a thickness (t) of 1 to 100 μm, and more preferably 5 to 50 μm. In this case, the ratio of the particle size to the film thickness (d/t) is, for example, in the range of from 0.01 to 1 and it is assumed to be preferable that this ratio is in the range of from 0.1 to 1.

<Phosphide Particle Layer, Phosphide Particles and Raw Material Particles>

(1) The phosphide particle layer may include a modifying element in addition to the essential basic elements. A variety of elements can be used as a modifying element which contributes to an improvement in characteristics of the phosphide particle layer. It is especially preferable that the phosphide particle layer is a nitrogen-containing phosphide particle layer, because it makes an improvement in corrosion resistance and conductivity. This N can be supplied from the raw material particles or introduced by nitriding treatment after formation of the phosphide particle layer. It should be noted that nitrogen-containing phosphide mentioned in the present invention includes phosphorus nitride.

(2) When the raw material particles are a supply source of N, at least part of the raw material particles can be particles holding nitrogen by containing N or having N attached thereto. Specifically, in some cases, the raw material particles include nitride particles comprising a nitride, which is a chemical compound of N, and in other cases the phosphide particles are nitrogen-containing phosphide particles, and in still other cases, N is attached to the phosphide particles. "Attachment" of N is assumed to include attachment of $N_2$ gas to a surface of the particles, and adsorption of N by a surface of the particles.

(3) As mentioned above, the raw material particles can be only the phosphide particles comprising the essential basic elements, or mixed particles including nitride particles, metal particles and/or the like in addition to the phosphide particles. Metal particles to be mixed with the phosphide particles are not limited in kind. However, if the phosphide particles comprise titanium phosphide, it is preferable that the metal particles are Fe-containing metal particles. If the phosphide particles comprise iron phosphide, it is preferable that the metal particles are Ti-containing metal particles. Moreover, if the phosphide particles do not contain Ti or Fe, it is preferable that the metal particles contain at least one of Ti and Fe.

In any case, the compositional range of the raw material particles is not limited, and a phosphide particle layer having at least one of good corrosion resistance and good conductivity is obtained by using raw material particles having various kinds of composition. However, in order to improve corrosion resistance or conductivity of the conductive film, it is preferable that the raw material particles contain 3 to 40 atomic % of P and, more preferably, 10 to 35 atomic % of P, with respect to the total number of atoms in the raw material particles (or the phosphide particles). A lower limit or an upper limit of P can be any of 5 atomic %, 8 atomic %, 15 atomic %, 20 atomic %, 25 atomic % and 30 atomic %. In these cases, when the raw material particles comprise phosphide titanium particles, Ti occupies the remainder, and when the raw material particles comprise iron phosphide particles, Fe occupies the remainder. Of course, when the raw material particles comprise iron-titanium phosphide particles, Ti and Fe occupy the remainder.

(4) Examples of the phosphide particles include particles comprising at least one of titanium phosphide expressed by $Ti_xP_z$, iron phosphide expressed by $Fe_yP_z$, and iron-titanium phosphide expressed by $Fe_xTi_yP_z$, wherein x, y and z are natural numbers. More specifically, examples of the phosphide particles include phosphide particles comprising at least one of TiP, $Ti_2P$, $Ti_3P$, $Ti_5P_3$, $Fe_2P$ and FeTiP. A preferred example of titanium phosphide particles is $Ti_3P$ particles, and a preferred example of iron-titanium phosphide particles is FeTiP particles.

It should be noted that the whole phosphide particles need not have the same composition or the same structure. That is to say, the phosphide particles only require that a phosphide comprising at least one of Ti and/or Fe, and P is formed on a surface of each base material particle, which serves as a core. Of course, the surface can be further applied with nitriding treatment, or can contain another modifying element at least in a surface layer (the conductive film).

<Conductive Powder and its Production Process>

(1) Conductive powder is a collective entity of phosphide particles comprising a chemical compound of at least one of Ti and Fe, and P. This conductive powder becomes, for example, a supply source of the abovementioned raw material particles. However, intended use of the conductive powder is not limited to this, and owing to good conductivity or corrosion resistance of its constituent particles, the conductive powder can be used for a variety of applications. It should be noted that composition and structure of the conductive powder are similar to those of the raw material particles and the phosphide particles mentioned above.

(2) The conductive powder can be obtained by pulverizing a chemical compound of a desired composition, but it is also possible to generate phosphide particles of a desired composition from mixed powder of plural kinds of powder. For example, it is assumable to obtain conductive powder comprising phosphide particles of a desired composition by curing mixed powder of phosphide powder and metal powder.

The phosphide powder to be mixed here may contain at least one of Ti and Fe, and can contain neither Ti nor Fe. This is because Ti or Fe can be supplied as metal powder. Of course, when the phosphide powder contains one of Ti and Fe, the other metal element may be supplied as metal powder. Moreover, as long as mixed powder as a whole contains at least one of Ti and Fe, metal powder is not limited to pure metal or an alloy of at least one of Ti and Fe. As long as metal powder does not adversely affect conductivity or corrosion resistance of resultant phosphide particles, the metal powder can comprise pure metal or an alloy of a metal element other than Ti and Fe.

Moreover, when N is introduced in the phosphide particle layer, it is preferable to apply nitriding treatment (powder nitriding step) to the raw material powder. This raw material powder can be not only the phosphide powder containing at least one of Ti and Fe, but also the abovementioned mixed powder. When the mixed powder is used, nitriding treatment can be applied either before or after the mixing step, or even after the hardening step.

(3) The conductive powder can be powder in which a conductive film comprising a chemical compound of at least one of Ti and/or Fe, and P (and N, etc.) is formed on a surface of each base material particle, which serves as a core. For example, this powder can be obtained by applying phosphate treatment to base material powder comprising Ti, Fe or the like.

Examples of phosphate include $Na_3PO_4$, $Ca_3(PO_4)_2$, $KPO_3$ and $CaHPO_4$. Examples of a material to be mixed to this phosphate include boric acid and borate, more specifically, $B_2O_3$, $Na_2B_4O_7$ and so on. It is also possible to use mixed salt of these. The use of mixed salt can reduce viscosity of molten salt and melting temperature and improve operability. It should be noted that even if the base material particles do not contain Fe, the use of an iron crucible as a bath of molten salt leads to a supply of Fe from the iron crucible.

When phosphate treatment is applied, heating or warming may be applied in order to promote a reaction of a chemical compound or a salt formed on a surface of the base material particles (a heating step). Furthermore, a (gas) nitriding step can also serve as this heating step. It should be noted that examples of the nitriding process mentioned in the present invention include gas nitriding (including gas soft nitriding), ion nitriding, salt bath nitriding (including salt bath soft-nitriding (Tufftride)). Gas nitriding is preferable, because nitriding treatment can be performed by using a relatively simple device or step. Examples of nitriding gas include $N_2$ gas, $NH_3$ gas and a mixed gas thereof. Treatment temperature and treatment time of gas nitriding are appropriately selected in consideration of gas composition, the amount of N to be introduced, transformation temperature of a substrate material. For example, when nitriding treatment is applied by $N_2$ gas, treatment temperature can be 700 to 1,050 deg. C. and treatment time can be 0.5 to 2 hours.

B. Corrosion-Resistant Conductive Film, etc.

<Iron-Containing Titanium Phosphide Layer>

(1) A corrosion-resistant conduction film having an iron-containing titanium phosphide layer can exhibit at least one of good corrosion resistance and good conductivity. This iron-containing titanium phosphide layer contains Ti, Fe and P as essential elements (hereinafter these three elements appropriately referred to as "essential basic elements"). However, the compositional range of these elements is not limited particularly. The present inventors' research has clarified that as far as the iron-containing titanium phosphide layer comprises the above essential basic elements, good corrosion resistance or conductivity is exhibited at a wide compositional range.

By the way, the amount of Fe of the essential basic elements can be very small, as long as it is contained in the iron-containing titanium phosphide layer. It is suitable that the iron-containing titanium phosphide layer contains Fe in an amount satisfying O atomic %<Fe<50 atomic %, with respect to the total number of atoms in the iron-containing titanium phosphide layer. An excessively small or large amount of Fe can cause deterioration in corrosion resistance or conductivity. A lower limit of Fe is preferably any of 24 atomic %, 27 atomic % and 30 atomic %. On the other hand, an upper limit of Fe is preferably any of 42 atomic %, 39 atomic % and 36 atomic %. It is particularly preferable that Fe is in the range of from 32 to 34 atomic %.

Preferably the iron-containing titanium phosphide layer contains P in the range of 27 to 39 atomic %, 30 to 36 atomic %, or 32 to 34 atomic % with respect to the total number of atoms in the iron-containing titanium phosphide layer.

When Fe and P fall in the abovementioned ranges, basically Ti occupies the remainder of the iron-containing titanium phosphide layer. However, the iron-containing titanium phosphide layer can contain a modifying element in addition to the essential basic elements.

(2) Although the iron-containing titanium phosphide layer comprises the abovementioned essential basic elements, basic structure (or crystal structure) of the chemical compound is not necessarily uniform. That is to say, the iron-containing titanium phosphide layer can vary its structure together with a variation in composition. However, the present inventors' analysis has revealed that at least part of the iron-containing titanium phosphide layer can comprise FeTiP. FeTiP has a structure in which Fe, Ti and P are connected to one another, and owing to addition of a bond with Fe, a bond with P gets stronger when compared with a Ti—P bond and this structure can be maintained even in a corrosive environment. This is supposed to be a reason why the iron-containing titanium phosphide layer comprising FeTiP exhibits good corrosion resistant conductivity.

By the way, the iron-containing titanium phosphide layer can have a single kind of crystal structure, but can have a multilayer structure comprising plural kinds of crystal structure, because as mentioned above the iron-containing titanium phosphide layer can vary its crystal structure from an outermost surface layer toward the base material. In any case, the iron-containing titanium phosphide layer has at least one of good corrosion resistance and good conductivity. Even if the corrosion-resistant conduction material has an inner part which has poor corrosion resistance or poor conductivity, as long as the iron-containing titanium phosphide layer comprising FeTiP exists on an outermost surface layer, the corrosion-resistant conduction material as a whole can exhibit good corrosion resistant conductivity.

<Corrosion-Resistant Conduction Film>

The corrosion-resistant conduction film can have a multilayer structure. For example, the corrosion-resistant conduction film can comprise not only the iron-containing titanium phosphide layer but also a supporting layer for supporting the iron-containing titanium phosphide layer. For example, this supporting layer comprises $Ti_3P$. $Ti_3P$ is inherently conductive. Even if FeTiP on a surface of $Ti_3P$ (the supporting layer) is lost for some reason and $Ti_3P$ is exposed to a corrosive environment, the surface will be covered with a Ti—P—O film, which is an oxide film having conductivity. Therefore, it is assumed that even when the film is a composite film, its corrosion resistant conductivity is not damaged. When the iron-containing titanium phosphide layer is supported by the supporting layer comprising $Ti_3P$, it is assumed that the corrosion-resistant conduction film exhibits corrosion resistant conductivity more stably.

<Production Process>

(1) Formation of the iron-containing titanium phosphide layer requires existence of the essential basic elements. These essential basic elements can be supplied independently of the substrate material, but can be supplied from a side of the substrate material containing Ti or Fe. Here, the side of the base material means not only a case where the substrate material in itself comprises Ti (or a titanium alloy) or Fe (or a Fe alloy), but also a case where the base material comprises an element other than the essential basic elements but a Ti- or Fe-containing film is formed on a surface of the substrate material. Such a Ti- or Fe-containing film is formed, for example, by vapor deposition such as sputtering. In this case, the film can have a low degree of crystallinity and have an amorphous phase.

In any case, Fe-containing phosphide is necessary to be formed on a surface of the substrate material. For example, when the substrate material is a Ti-based material substrate comprising pure titanium or a titanium alloy, phosphide can be formed on a surface of the substrate material by contacting the substrate material with Fe-containing phosphate. For example, the iron-containing titanium phosphide layer can be formed by dipping a Ti-based material substrate in molten salt of Fe-containing phosphate.

In this regard, phosphate was discussed previously. It should be noted that an iron crucible used as a bath for molten salt can be a supply source of Fe.

(2) In addition to the above process, the iron-containing titanium phosphide layer can also be formed by attaching powder including at least one kind of the essential basic elements to the substrate material (an attaching step) (powder treatment process). For example, a slurry formed by dispersing one kind or a plurality of kinds of fine powder in a solvent can be coated on a substrate (a coating step), and the coated slurry can be dried and heated (a drying and heating step) and then excessive slurry can be removed (a removing step).

(3) Heating Step (Warming Step)

Heating or warming can be applied in order to promote a reaction of a chemical compound or a salt formed on a surface of the substrate. Of course, if a favorable corrosion-resistant conduction film is formed without heating or the like, the heating step or the like is not necessary. Preferably the heating step or the like is conducted in a non-oxidizing atmosphere, and heating time and so on are appropriately adjusted in accordance with composition and film thickness of the corrosion-resistant conduction film. If the next gas nitriding step serves also as this heating step, it is efficient.

(4) Nitriding Step

If a nitriding step is carried out after the above-mentioned removing step, N can be introduced into the iron-containing titanium phosphide layer or O which has been mixed therein can be removed by reduction. According to the present inventors' research, a corrosion-resistant conduction film to which this nitriding step is applied also exhibits at least one of good corrosion resistance and good conductivity. In particular, this corrosion-resistant conduction film can exhibit stable conductivity even in an oxidizing atmosphere.

Examples of the nitriding process include gas nitriding (including gas soft-nitriding), ion nitriding, and salt bath nitriding (including salt bath soft-nitriding (tufftride)). However, gas nitriding is preferable for forming this corrosion-resistant conduction film. This is because nitriding treatment can be carried out in a relatively simple device or step.

Gas used for gas nitriding is $N_2$ gas, $NH_3$ gas, a mixture of these gases, and so on. In these cases, nitriding gas may flow. Treatment temperature and treatment time are appropriately adjusted in accordance with gas composition and the amount of N to be introduced. However, in a case of nitriding by $N_2$ gas, treatment temperature is preferably 700 to 1,050 deg. C., and treatment time is preferably 0.5 to 2 hours. The treatment temperature is suitably selected in consideration of transformation temperature of a base material and so on.

C. Corrosion-Resistant Conduction Material, etc.

<Film>

(1) Titanium Phosphide Film

A corrosion-resistant conduction material comprises, for example, at least a titanium phosphide film on a surface of a substrate material. Examples of titanium phosphide constituting this film include not only TiP but also $Ti_3P$, $Ti_2P$, $Ti_7P_4$, $Ti_5P_3$ and $Ti_4P_3$. $Ti_3P$ is preferable, because $Ti_3P$ is chemically the most stable. The titanium phosphide film preferably has a film thickness of 0.5 to 20 μm, and more preferably 2 to 10 μm. The titanium phosphide film can contain Fe. Fe is contained in a form of phosphide such as $Fe_3P$.

(2) Titanium Nitride Film

The corrosion-resistant conduction material can further include a titanium nitride (TiN) film on a surface thereof. That is to say, the corrosion-resistant conduction material can comprise a corrosion-resistant conduction film comprising a composite film of a titanium phosphide film and a titanium nitride film. The titanium nitride film exhibits corrosion resistance in an acidic atmosphere and does not damage conductivity of the titanium phosphide film. The titanium nitride film preferably has a film thickness of 0.001 to 10 μm and more preferably 2 to 4 μm.

(3) Ti—P—O-based Film

The corrosion-resistant conduction material can further include a Ti—P—O-based film on a surface thereof. That is to say, the corrosion-resistant conduction material can comprise a corrosion-resistant conduction film comprising a composite film of a titanium phosphide film and a Ti—P—O-based film. The Ti—P—O-based film exhibits high corrosion resistance in a strongly acidic atmosphere and does not damage conductivity of the titanium phosphide film because the Ti—P—O-based film inherently has high electron conductivity. Specifically, a strongly acidic atmosphere has a pH of 3 to 1, or 2.5 to 1.5. Of course the Ti—P—O-based film can exhibit favorable corrosion resistance in an acidic atmosphere of about pH 6 to pH 3.

This Ti—P—O-based film can exist as an extremely thin film of about 1 to 200 nm on a surface of the titanium phosphide film. Therefore, it is difficult to exactly identify composition of the Ti—P—O-based film. However, it is obvious from an EDX analytical result shown in FIG. 10 that the film is a ternary material and has an amorphous phase, which does not have any specific crystal structure.

<Production Process>

For example, the following unprecedented novel process can be used as a process for producing a corrosion-resistant conduction material (including a process for fotiuing a corrosion-resistant conduction film).

(1) Plating Step

First, in a plating step, a Ti-based material substrate is dipped in a plating solution containing at least P, thereby forming a plating layer on a surface of the substrate. The plating can be electroplating or electroless plating. Especially electroless plating is preferable because electroless plating has a good covering capability and even a substrate of a complicated shape can obtain a plating layer of a uniform thickness on a surface thereof. Although thickness of the plating layer is appropriately adjusted in accordance with a desired thickness of a corrosion-resistant conduction film, it is preferably 0.1 to 5 μm.

The plating solution only need to contain P, and can be not only an Ni—P plating solution but also an Fe—P plating solution, an Ni—P—Fe plating solution, or the like. An element constituting the plating layer does not always have to be supplied from the plating solution and can be supplied from a side of the base material.

(2) Nitriding Step

Next, in a nitriding step, N is introduced into a corrosion-resistant conduction film. Thereby, a chemically stable composite film of a titanium phosphide film and a TiN film is formed and corrosion resistant conductivity is ensured. In addition, O which has been introduced in the corrosion-resistant conduction film before the nitriding step is removed by reduction or the like.

Examples of this nitriding process include gas nitriding (including gas soft-nitriding), ion nitriding (including plasma nitriding), salt bath nitriding (including salt bath soft-nitriding (Tufftride)). However, gas nitriding is preferable for forming a corrosion-resistant conduction film. This is because N can be introduced into the corrosion-resistant conduction film in a relatively simple device or step.

Gas nitriding is carried out by holding the substrate after the abovementioned pretreatment in a high-temperature atmosphere which is filled with $N_2$ gas, $NH_3$ gas, a mixture of these gases, or the like. These nitriding gases may flow. In particular, gas nitriding using $NH_3$ gas has a stronger nitriding power than gas nitriding using pure $N_2$ gas. When $NH_3$ gas is used, a nitriding atmosphere can be formed by simply introducing $NH_3$ gas into a furnace in which the base material is to be placed and making the $NH_3$ gas replace a gas (air) which has existed in the furnace. Since there is no need to evacuate the air from the inside of the furnace, this is an economical process.

Treatment temperature and treatment time are appropriately adjusted in accordance with gas composition and the amount of N to be introduced. In a case of nitriding by $N_2$ gas, treatment temperature is preferably 850 to 1,100 deg. C. and more preferably 950 to 1,050 deg. C., and treatment time is preferably 0.5 to 2 hours. In a case of nitriding by $NH_3$ gas, treatment temperature can be a low temperature of not less than 650 deg. C.

(3) Oxidizing Step

In an oxidizing step, the titanium nitride film as a surface layer is removed and a Ti—P—O-based filth is formed on a surface of the titanium phosphide film. The oxidizing step is carried out by exposing the corrosion-resistant conduction material after the nitriding step to an atmosphere which is so strongly acidic as to erode the titanium nitride film. The strongly acidic atmosphere has a pH of 3 to 1, or a pH of 2.5 to 1.5, and for example, it is preferable to immerse the corrosion-resistant conduction material after the nitriding treatment in a strongly acidic corrosive solution. When the abovementioned solution is used, it is desirable that solution temperature is 50 to 80 deg. C., immersion time is 1 to 50 hours and corrosion voltage is 1.0 to 2.0 V (vs. SHE).

The structure of the Ti—P—O-based film is not limited in particular. An analytical result of electron diffraction pattern has revealed that the Ti—P—O-based film obtained by the above-mentioned process has an amorphous phase or contains very fine microcrystals.

D. Process for Producing Corrosion-Resistant Conduction Material, etc.

Executing the abovementioned plating step and the nitriding step enables to obtain a corrosion-resistant conduction material having a corrosion-resistant conduction film having at least one of good corrosion resistance and good conductivity. Preferably the nitriding step is carried out at a treatment temperature of not more than α-β solid phase transformation temperature of the Ti-based material substrate. Specifically, it is preferable that the nitriding step is carried out at not more than 880 deg. C., and more preferably 650 to 850 deg. C. Treatment temperature mentioned here is a temperature of the Ti-based material substrate during the nitriding treatment. If treatment temperature is not more than 880 deg. C., because the treatment temperature does not exceed the α-β solid phase transformation temperature of Ti, internal residue stress of the corrosion-resistant conduction film is small and as a result there is little deformation or peeling. Moreover, because the treatment temperature is low, oxidation of the corrosion-resistant conduction film is suppressed.

In executing this nitriding step, it is preferable to use $NH_3$ gas, which has a stronger nitriding powder than pure $N_2$ gas. The use of $NH_3$ gas enables sufficient nitriding even at a treatment temperature of not more than 880 deg. C. When mixed gas of $N_2$ gas and $H_2$ gas is used, a similar effect is obtained. In a case of these kinds of gas nitriding, treatment time can be 0.05 to 3 hours, or 0.5 to 2 hours. Of course, suitable treatment time is appropriately adjusted in accordance with gas composition and the amount of N to be introduced. It is desirable that the Ti-based material substrate is not exposed to an environment exceeding 880 deg. C. in all steps including the nitriding step. If a heat treatment step is executed, it is preferably executed at not more than 880 deg. C.

E. Application Purposes

Application purposes of the conductive film, the corrosion-resistant conduction film, the corrosion-resistant conduction material, the conductive powder or the like according to the present invention are not limited in particular and a variety of applications are possible. The conductive material or the corrosion-resistant conduction material having the conductive film or the corrosion-resistant conduction film on a substrate is not limited to a final or nearly final product, but can be an intermediate product in a form of an ingot, a bar, a tube or a plate, or a raw material such as powder. A preferred example of the conductive material is a current-carrying member to be used in a corrosive environment, such as the abovementioned bipolar plate for a polymer electrolyte fuel cell.

EXAMPLES

Now, the present invention will be described more concretely by way of examples.

A. First Embodiment

<Production of Test Specimens>

(1) Preparation of Phosphide Coating Material

Phosphide coating materials were prepared by introducing various kinds of powder (conductive powder, raw material particles, phosphide particles) shown in Table 1 into an aqueous anionic coating solution, "Elecoat Nicelon" produced by Shimizu Co., Ltd. and mixing them sufficiently. The mixing ratio was 0.05 g of powder to 0.5 cc of the coating solution.

When mixed powder of plural kinds of powder was used, the respective kinds of powder were equally weighed and mixed (a mixing step). It should be noted that the various kinds of powder mixed in the coating solution was obtained by curing the mixed powder and then mechanically pulverizing the cured powder. These kinds of powder had a particle size of 1 to 100 μm.

In addition, gas nitriding treatment (a nitriding step) was applied to some of the mixed powder. This nitriding treatment was carried out by heating in an ammonia gas atmosphere at 850 deg. C. for two hours (a powder nitriding step). Thus powder comprising nitrogen-containing phosphide particles was obtained. Furthermore, instead of applying nitriding treatment, mixed powder of phosphide powder and nitride powder was also prepared.

(2) Coating

The abovementioned various kinds of phosphide coating materials were applied to a surface of various kinds of substrates shown in Table 1 (an attaching step, a coating step). Specifically, each coating material was dropped on each substrate and the drops were extended uniformly, thereby forming a coated film. This coated film had a thickness of 1 to 100 μm.

(3) Curing

Each substrate after coating was heated in a heating furnace in an air atmosphere at 190 deg. C. for 40 minutes, thereby curing a coated film (a phosphide particle coated film) on each substrate (a fixing step, a hardening step). This coated film had a thickness of 1 to 100 μm.

<Measurement>

(1) Test Example 1

Test specimens A1 to A4 and B1 to B3 were evaluated about corrosion resistant conductivity as follows.

(i) First, a corrosive solution comprising a dilute aqueous sulfuric acid solution which was adjusted to pH 4, 5 ppm $F^-$ and 10 ppm $Cl^-$ was prepared. This corrosive solution was warmed to 80 deg. C., and the abovementioned test specimens were immersed in this corrosive solution. Each test specimen in this state was applied with a potential of 0.26 V (vs. Pt) and held for 0 to 100 hours (corrosion time). Thus, a potentiostatic corrosion test was conducted.

(ii) Contact resistance of each test specimen during or after this corrosion test was measured by four-terminal sensing, as shown in FIG. 1. That is to say, each test specimen S and a sheet of carbon paper 105 in a laminated state were sandwiched between two gold-plated copper plates 161, 162, and a stationary current of 1 A was applied between the gold-plated copper plates 161, 162 from a constant DC source 107. At this time, a load F of 1.47 MPa air pressure was applied between the gold-plated copper plates 61, 62. After keeping this state for 60 seconds, a potential difference V between the gold-plated copper plates 161, 162 was measured. From the potential difference V thus obtained and a current value A, contact resistance R (=V/A) was calculated. It should be noted that each test specimen S and the sheet of carbon paper 105 had a contact area of 4 $cm^2$.

Figure 2:
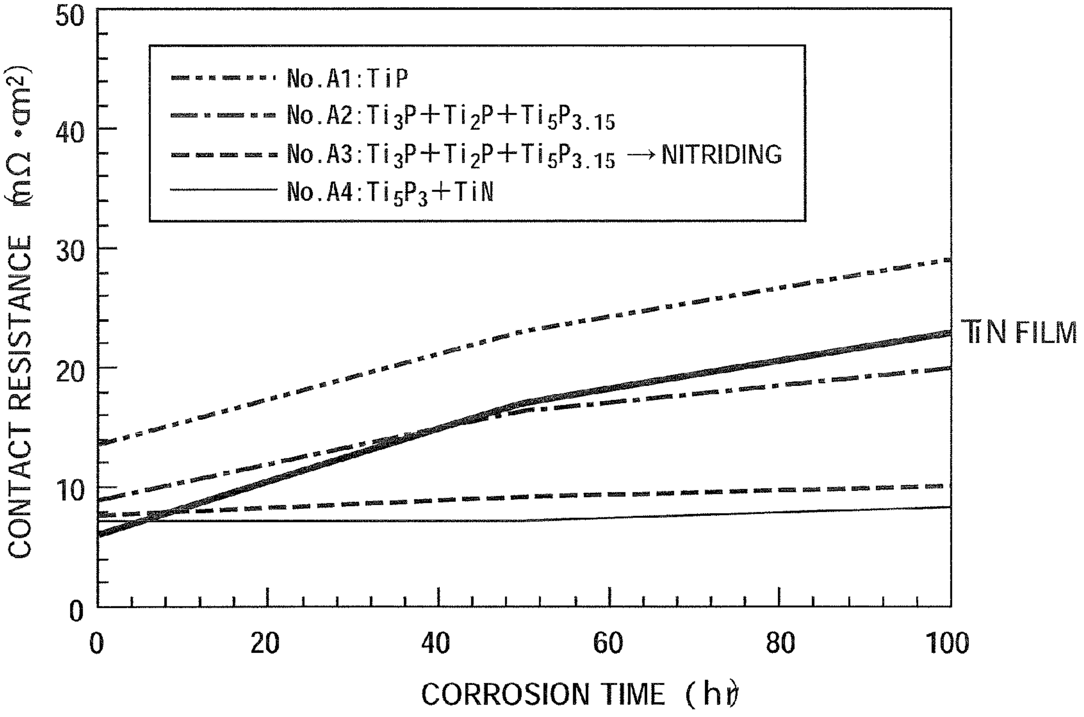
FIG. 2 is a graph showing the relation between constant potential corrosion test time (corrosion time) and contact resistance of conductive materials having conductive films comprising various Ti-containing phosphide particles.
Figure 3:
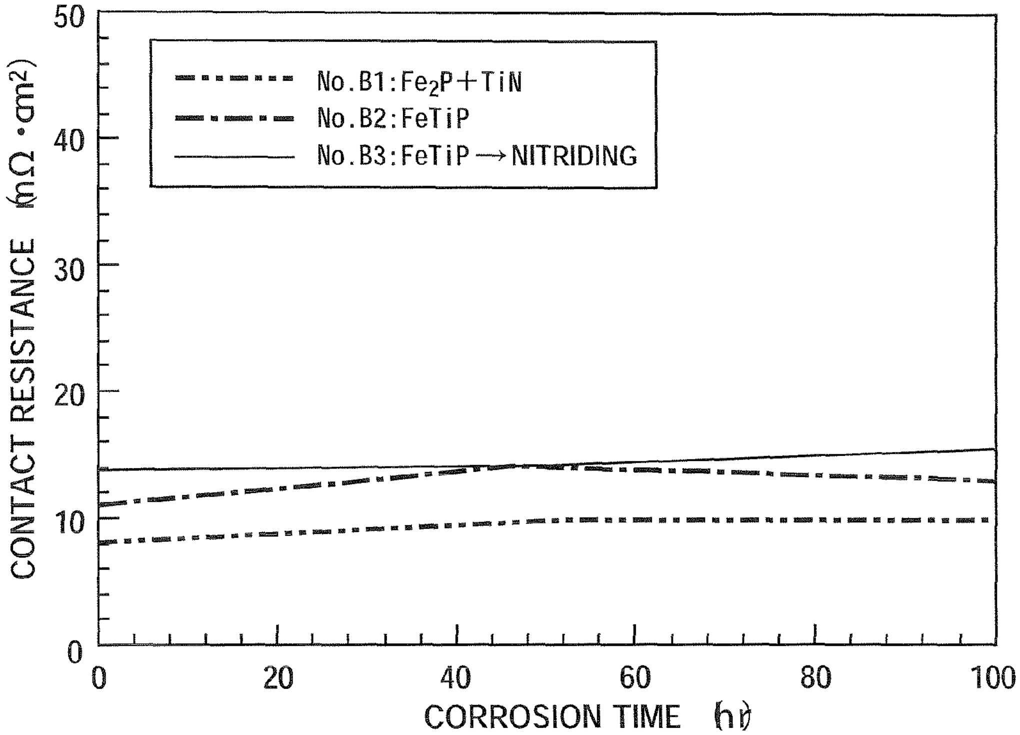
FIG. 3 is a graph showing the relation between corrosion time and contact resistance of conductive materials having conductive films comprising various Fe-containing phosphide particles.

(iii) The relation between corrosion time and corrosion resistance measured about each test specimen is shown in FIG. 2 and FIG. 3. For comparison, a test specimen were prepared in which a TiN film was formed on a surface of a titanium substrate by applying gas nitriding treatment ($NH_3$ gas, 1,000 deg. C. for 2 hours) directly to the titanium substrate. This comparative specimen was also subjected to a potentiostatic corrosion test similar to the above. This result is also shown in FIG. 2.

(2) Test Example 2

The test specimen A3 was subjected to a potentiostatic corrosion test similar to that of Test Example 1 for 100 hours by preparing a dilute aqueous sulfuric acid solution which was adjusted to pH 2, 50 ppm $F^-$, 10 ppm $Cl^-$, and which was more strongly corrosive than the corrosive solution used in Test Example 1. Contact resistance of this test specimen after 100 hours measured by a similar manner to Test Example 1 was 12.68 $m\Omega cm^2$.

(3) Test Example 3

Figure 4:
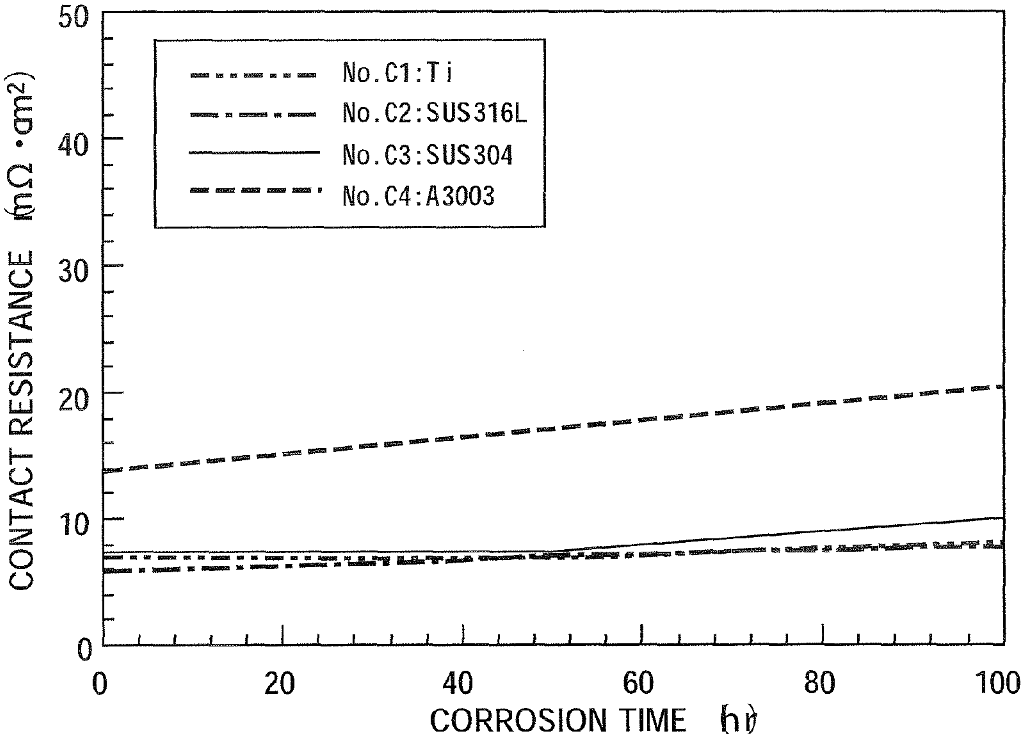
FIG. 4 is a graph showing the relation between corrosion time and contact resistance of conductive materials comprising substrates which are different in material.

Test specimens C1 to C4 were subjected to a potentiostatic corrosion test similar to that of Test Example 1 and the relation between corrosion time and corrosion resistance measured about each test specimen is shown in FIG. 4.

<Evaluation>

(1) As apparent from FIG. 2, all the phosphide particle coated films (phosphide particle layers) mainly comprising titanium phosphide particles, as indicated by the test specimens A1 to A4, exhibited sufficiently small contact resistance when compared with the conventional. It was confirmed that the coated films to which N was introduced by nitriding treatment or TiN mixing showed little change in contact resistance even when placed in a severe corrosive environment for a long time. That is to say, it has become apparent that these coated films can attain high conductivity extremely stably even in a severe environment.

(2) As apparent from FIG. 3, all the phosphide particle coated films mainly comprising iron-titanium phosphide particles, as indicated by the test specimens B1 to B3, showed little change in contact resistance even when placed in a severe environment for a long time and it has become apparent that these coated films can attain high conductivity extremely stably even in a severe environment. It also has become apparent that the coated films to which N was introduced by nitriding treatment or TiN mixing shows more stable conductivity.

(3) As apparent from FIG. 4, even if the substrates on which the phosphide particle layers were formed were different in material from each other as indicated by the test specimens C1 to C4, the coated films exhibited stable contact resistance even when placed in a severe corrosive environment for a long time. That is to say, it has become apparent that the phosphide particle coated films (the phosphide particle layers) according to this embodiment maintain good conductivity in a severe corrosive environment independently of the material of the base materials. It has also become apparent that a titanium substrate or a stainless steel substrate, which have particularly good corrosion resistance, can obtain more stable conductivity of a coated film than an aluminum alloy substrate.

(4) From the results of Test Example 2, it is assumed that not only the test specimen A3 but also the other test specimens can maintain such good corrosion resistant conductivity as the abovementioned stably even if the corrosive environment becomes severer.

(5) In addition, crystal structure of the titanium phosphide particles comprising $Ti_2P+Ti_3P+Ti_5P_{3.15}$ indicated by the test specimen A3 was observed before and after the nitriding treatment by an X-ray diffractometer (XRD), but no big difference was observed.

B. Second Embodiment

<Production of Test Specimen>

A titanium substrate (a Ti-based material substrate) comprising pure titanium (JIS Type 1) was applied with the following molten salt dipping.

First, molten salt (a treatment material) comprising mixed salt of sodium phosphate ($Na_3PO_4$), boric anhydride ($B_2O_3$) and tricalcium phosphate ($Ca_3(PO_4)_2$) was prepared in a crucible comprising iron (JIS SUS430). This molten salt had a temperature of 900 deg. C. and an atmosphere of the molten salt bath was the air. The titanium substrate was dipped in this molten salt (a contacting step, a dipping step). Dipping time was 5 minutes.

Then the titanium substrate was taken out of the molten salt and molten salt on a surface of the titanium substrate was washed off with water (a removing step). Then, gas nitriding treatment was applied by placing the titanium substrate in a flow of nitrogen gas ($N_2$>99.999%) at 1,000 deg. C. for 2 hours (a nitriding step). A test specimen (a corrosion-resistant conduction material) was thus obtained.

<Measurement and Evaluation>

(1) In order to evaluate corrosion resistant conductivity of the test specimen, first a corrosive solution comprising a dilute aqueous sulfuric acid solution which was adjusted to pH 2, 50 ppm $F^-$, 100 ppm $Cl^-$ was prepared. This corrosive solution was warmed to 80 deg. C. and the abovementioned test specimen was immersed in this corrosive solution. The test specimen in this state was applied with a corrosion voltage of 0.26 V (vs. Pt) and held for 100 hours (corrosion time). Thus, a corrosion test was carried out.

(2) Contact resistance of this test specimen (example) after this corrosion test was measured by four terminal sensing as shown in FIG. 1.

(3) For comparison, a test specimen (comparative example) having a TiN film was prepared by applying the abovementioned gas nitriding treatment (1,000 deg. C. for 2 hours) directly to another titanium substrate. Contact resistance of this test specimen before and after the constant potential corrosion test was measured in a similar way to the abovementioned example. Contact resistance of the example and the comparative example are shown in FIG. 5 for comparison.

Figure 5:
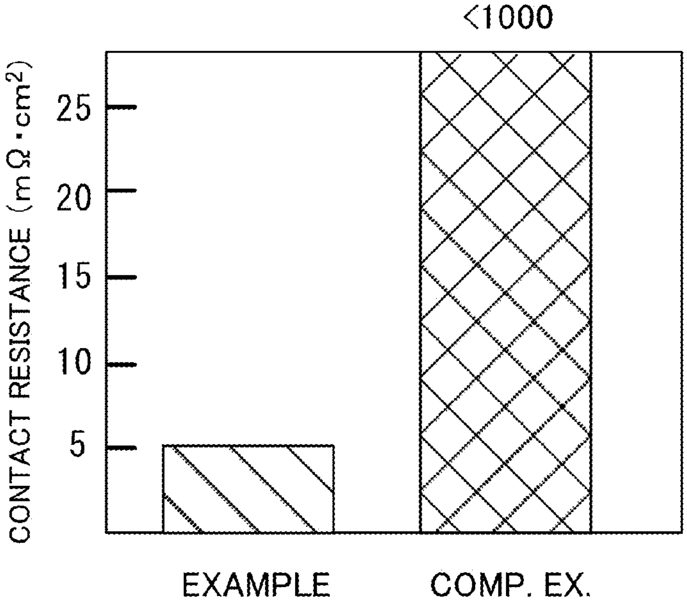
FIG. 5 is a bar graph showing contact resistance of an example according to a second embodiment and a comparative example.

(4) As apparent from FIG. 5, the example showed little change in contact resistance (contact resistant before the corrosion test: 4.5 $m\Omega cm^2$) in spite of being left in a severe corrosive environment for a long time, and it has become apparent that the example shows a very good corrosion resistant conductivity. On the other hand, contact resistance of the comparative example rapidly increased from 3.6 $m\Omega cm^2$ before the corrosion test to 1,000 $m\Omega cm^2$ or more after the corrosion test and it has become apparent that the comparative example has poor corrosion resistant conductivity.

<TEM Observation>

Figure 6:
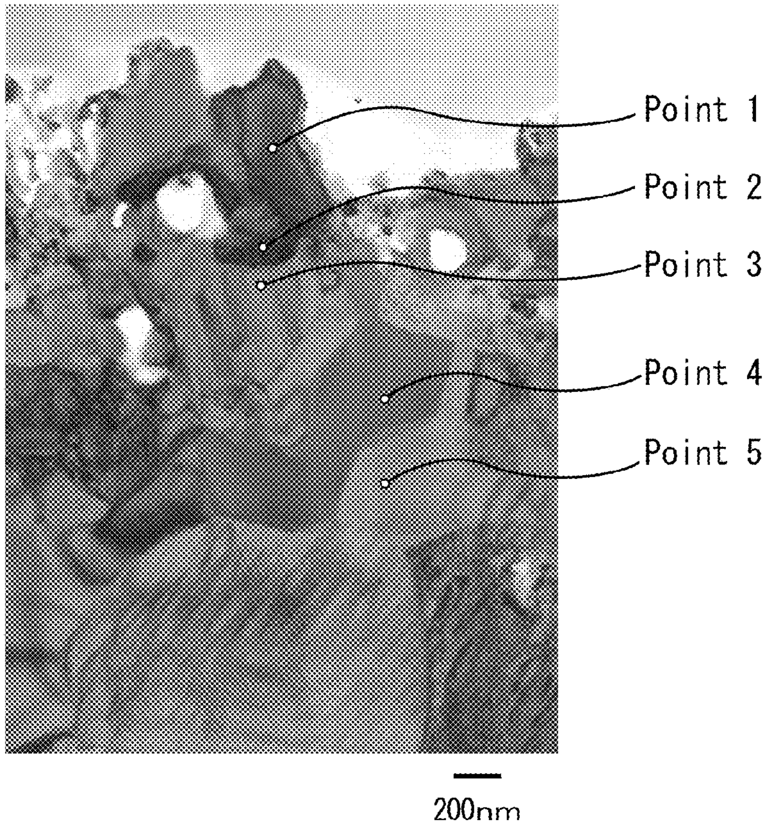
FIG. 6 is a TEM photograph of a cross section of the test specimen of the example according to the second embodiment.

(1) A transmission electron miscroscope (TEM) photograph of the film formed on a surface of the test specimen of the example is shown in FIG. 6. In FIG. 6, the upper side is an outermost surface side of the film and the lower side is a titanium substrate side. This photograph shows that a coated film was formed which had a multilayer structure comprising a plurality of crystals from the outermost surface side toward the substrate side.

(2) Chemical composition of the film at five points indicated on the TEM photograph was analyzed by a transmission electron microscope coupled with energy dispersive X-ray spectrometer (TEM-EDX) and analytical results are shown in Table 2. It is apparent from this table that the film extending from the outermost surface side to the substrate side contains Fe, P and Ti as its constituent elements. It is also apparent that the film's outermost surface portion (Point 1), which has the greatest effect on corrosion resistant conductivity of the film, comprises iron-containing titanium phosphide which contains a large amount of Fe. However, it is also apparent that the Fe content in the film decreases towards the substrate side and little Fe was detected at the nearest portion to the substrate (Point 5), which mainly comprises titanium phosphide.

Thus, it has become apparent that the iron-containing titanium phosphide layer in itself has a multilayer structure in which the Fe content changes or is distributed and at the same time the corrosion-resistant conduction film in itself has a multilayer structure comprising the iron-containing titanium phosphide layer, and the titanium phosphide layer (a supporting layer) which supports the iron-containing titanium phosphide layer.

Figure 7:
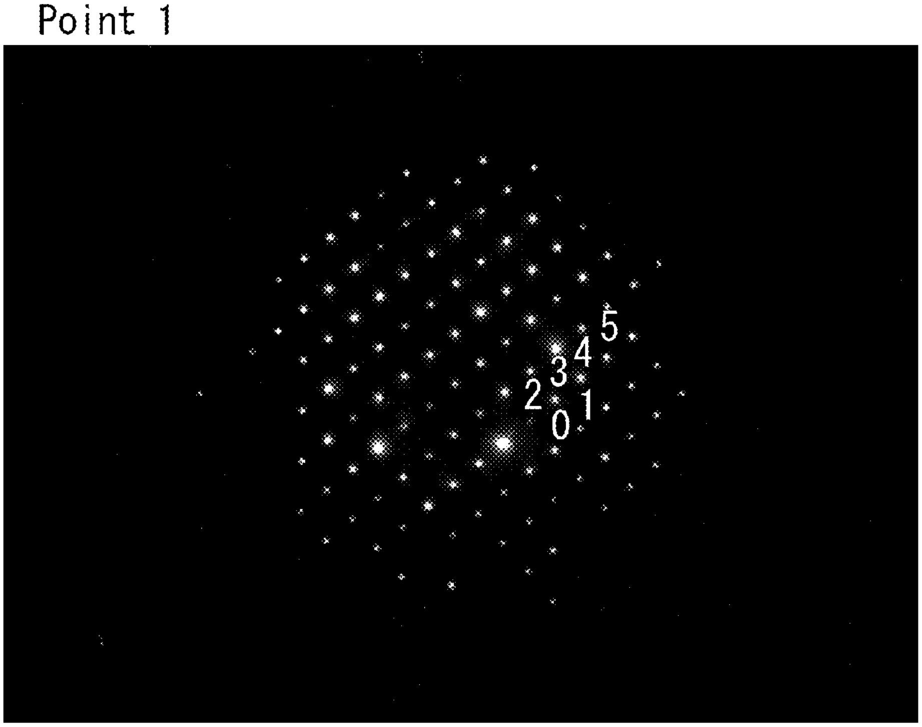
FIG. 7 is an electron diffraction pattern at Point 1 of the TEM photograph of FIG. 6.
Figure 8:
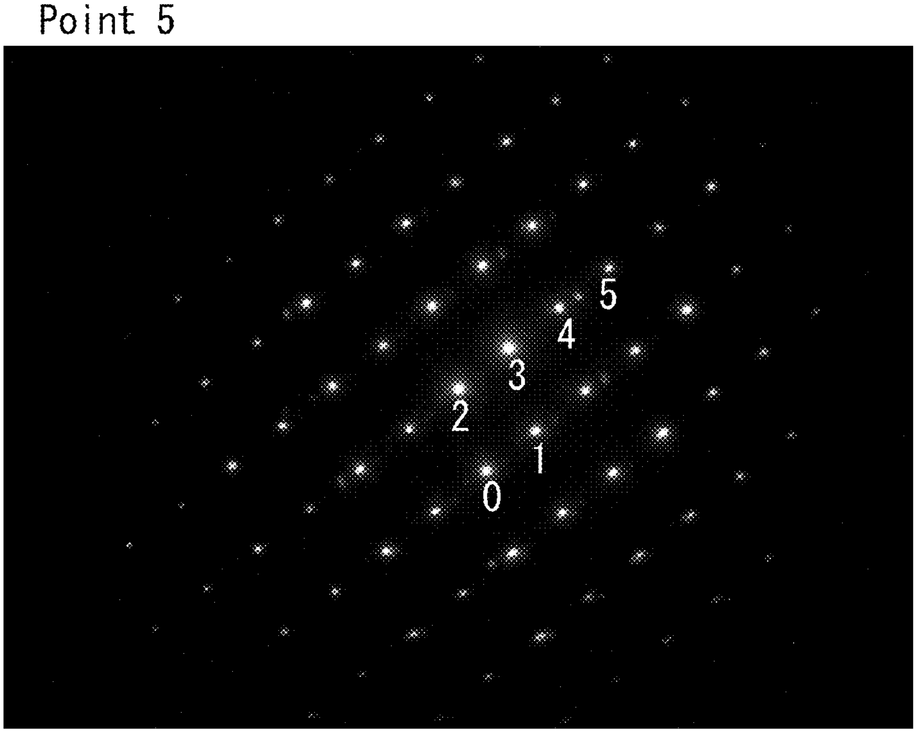
FIG. 8 is an electron diffraction pattern at Point 5 of the TEM photograph of FIG. 6.

(3) Electron diffraction patterns at Point 1 and Point 5 of the TEM photograph are shown in FIG. 7 and FIG. 8, respectively. Crystal lattice measurement results at Point 1 and Point 5 are shown in Table 3 and Table 4, respectively. Since measured values and standard values shown in each of these tables are identical to each other, it has become apparent that the corrosion-resistant conduction film of the example has FeTiP at the outermost surface portion (Point 1) and $Ti_3P$ on the substrate side (Point 5).

It should be noted that in Tables 3 and 4 "r" is the radius of the circle of the diffraction pattern, "d" is interplanar spacing, and "h, k, l" are Miller indices.

C. Third Embodiment

<Production of Test Specimen>

The following plating treatment was applied to a Ti substrate (a base material, a Ti-based material substrate) comprising pure titanium (JIS Type 1).

The abovementioned Ti substrate was dipped in an Ni—P plating solution and thereby an Ni-13% P plating layer of about 5 μm was formed on a surface of the substrate (a plating step). The Ni—P plating solution employed was "Top Nicoron P-13" produced by Okuno Chemical Industries Co., Ltd. The plating employed in this embodiment was electroless plating.

Gas nitriding using an $N_2$ gas atmosphere was applied to this Ni—P plated Ti substrate (a gas nitriding step). This gas nitriding was conducted with a gas composition of $N_2$>99.999%, a temperature of 1,000 deg. C. and time of 0.5 hour, and thus a test specimen 1 was obtained.

A constant potential corrosion test was conducted by immersing the test specimen 1 obtained by the above procedure in a corrosive solution (an oxidizing step). The corrosive solution was prepared by adding 50 ppm $F^-$ and 10 ppm $Cl^-$ to sulfuric acid (pH 2) and holding it at 80 deg. C. Corrosion voltage applied was 0.26 V (vs. Pt), and corrosion time was 100 hours. Hereinafter the test specimen 1 after the corrosion test will be described as a test specimen 1'.

<Observation>

Figure 9:
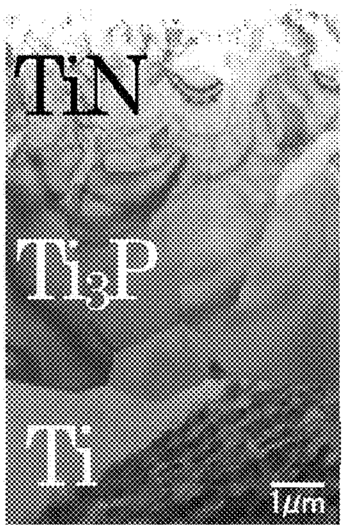
FIG. 9 is a transmission electron microscope (TEM) image of a cross section of a test specimen 1.
Figure 10:
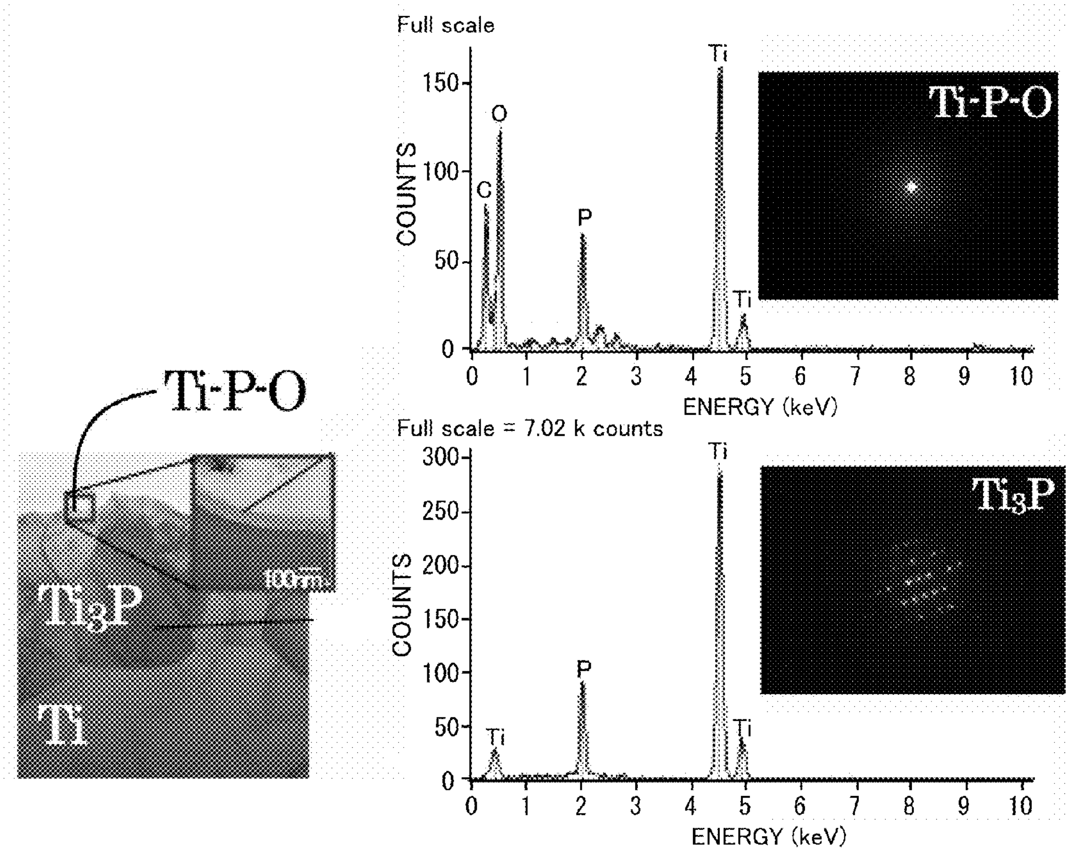
FIG. 10 shows a TEM image of a cross section of a test specimen 1', its electron diffraction patterns, and its elemental analysis results by an energy dispersive X-ray microanalyzer (EDX)

A cross section of the test specimen 1, 1' before and after the constant potential corrosion test was observed by a TEM. The cross section observed was a cross section perpendicular to the Ni—P plating layer-formed surface. A TEM image of the test specimen 1 (before the test) is shown in FIG. 9. A TEM image and electron diffraction pattern of the test specimen 1' (after the test) are shown in FIG. 10. FIG. 10 also shows elemental analytical results of a surface of the test specimen 1' after the constant potential corrosion test by the EDX.

In the test specimen 1, a composite film comprising a two-layer film was observed on a surface of the Ti substrate (FIG. 9). Of the composite film, a film on a Ti substrate side was identified from the electron diffraction pattern to comprise $Ti_3P$. Of the composite film, a film on an opposite side to the substrate, i.e, on an outermost surface side was identified from the electron diffraction pattern to comprise TiN. The fact that the surface of the test specimen 1 has a gold color, which is typical of TiN, also clearly shows that the film on the opposite side to the substrate comprises TiN. The electron diffraction pattern of $Ti_3P$ of the test specimen 1 was similar to the electron diffraction pattern of $Ti_3P$ shown in FIG. 10.

According to the EDX analytical results of the composite film, Ni was not detected. However, it was confirmed that the Ti substrate includes a Ti—Ni compound containing Ni, which is assumed to have diffused from the Ni—P plating layer in the nitriding step. This Ti—Ni chemical compound comprises, for example, crystal grain having a striped contrast shown in the lower right portion of FIG. 9.

In the test specimen 1', a composite film having a very thin surface layer of about 50 nm was observed on a surface of the Ti substrate (the left photograph of FIG. 10). It was identified from the EDX and the electron diffraction pattern that most of the composite film comprises $Ti_3P$. That is to say, it has become apparent that the $Ti_3P$ film remained even after the corrosion test. On the other hand, in the outermost surface layer, N was not detected and P and O in addition to Ti were detected. It should be noted that carbon (C) was detected by the EDX but this was detected from a coated film for analysis. That is to say, it is assumed that the TiN film of the test specimen 1 was removed in the abovementioned corrosion test (the oxidizing step) and a Ti—P—O-based film was formed by oxidizing a surface of the $Ti_3P$ film.

<Measurement>

Figure 11:
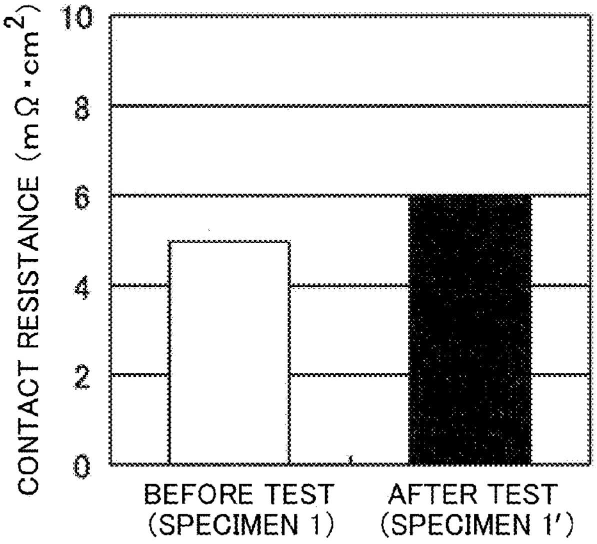
FIG. 11 is a graph showing contact resistance of the test specimen 1, 1'.
Figure 12:
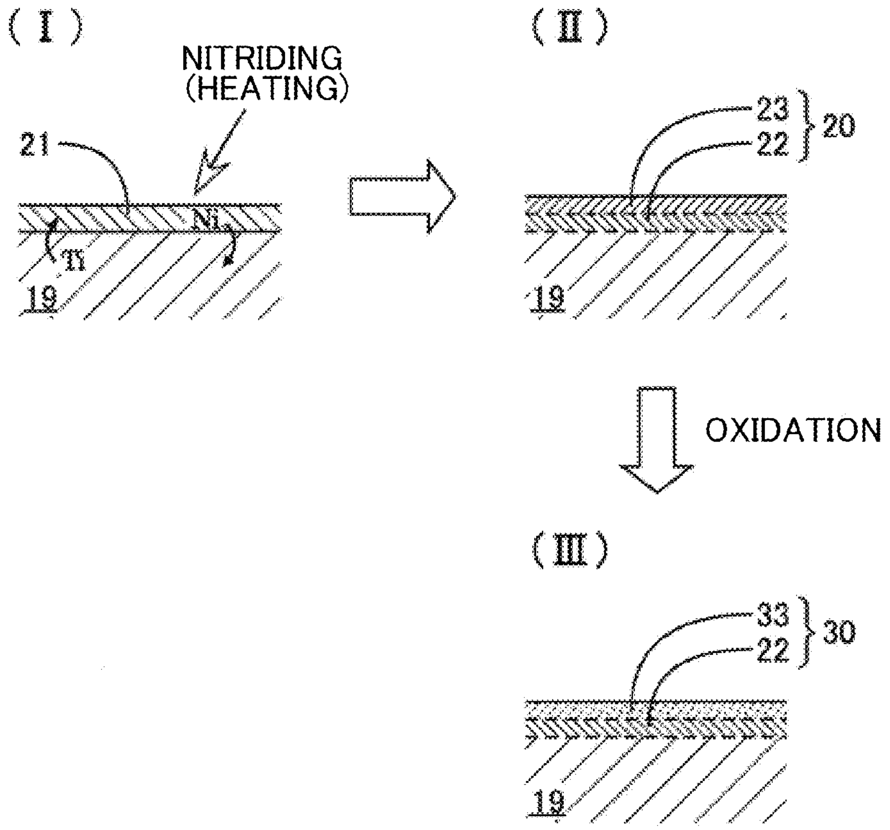
FIG. 12 is an explanatory diagram of a process for producing a corrosion-resistant conduction material.

Contact resistance of the test specimen 1, 1' was measured as shown in FIG. 1. Measurement results are shown in FIG. 11. The test specimen 1 (before the corrosion test) had a very low contact resistance of 5 m$\Omega$cm$^2$. Even the test specimen 1' after immersed in the strongly acidic corrosive solution of pH 2 also had a very low contact resistance of 6 m$\Omega$cm$^2$.

It has become apparent that owing to having at least a $Ti_3P$ film, the test specimen 1 is resistant to corrosion and stably exhibits high conductivity even when exposed to a strongly acidic atmosphere. It has also become apparent that owing to having a Ti—P—O-based film, the test specimen 1', which was obtained after placing the test specimen 1 in a strongly acidic environment, exhibits good corrosion resistance and conductivity.

In addition, a similar corrosion test was conducted on the test specimen 1 by using a corrosive solution which was prepared by adding 5 ppm $F^-$ and 10 ppm $Cl^-$ to dilute sulfuric acid of pH 4 and holding it at 80 deg. C. Also in this case, the surface of the test specimen 1 remained gold color and no change was observed on the TiN film. Contact resistance also showed no big change before and after the corrosion test. The contact resistance after the corrosion test was a sufficiently small value of 8 m$\Omega$cm$^2$.

D. Forth Embodiment

<Production of Test Specimens>

The following various kinds of Ni plating treatment was applied to Ti substrates (a Ti-based material substrate) comprising pure titanium (JIS Type 1).

(1) Ni—P Plating

One of the abovementioned Ti substrates was dipped in an Ni—P plating solution and an Ni-13% P plating layer of about 2.5 μm was formed on a surface of the substrate by electroless plating. The Ni—P plating solution used was "Top Nicron P-13" produced by Okuno Chemical Industries Co., Ltd.

Gas nitriding using an $N_2$ gas atmosphere was applied to this Ni—P plated Ti substrate (a gas nitriding step), thereby obtaining a test specimen 11. The gas nitriding was carried out by placing the Ti substrate having the Ni—P plating layer in a flow of mixed gas of 98% by volume of $N_2$ and 2% by volume of $H_2$ at a treatment temperature of 850 deg. C. for a treatment time of 2 hours.

(2) Ni—P—Fe Plating

An Ni—P—Fe plating solution was prepared by using nickel nitrate, iron sulfate and sodium hypophosphite. Three of the abovementioned Ti substrates were dipped in this plating solution and an Ni—P—Fe plating layer of about 2.5 μm was formed on a surface of each of the Ti substrates by electroless plating. The formed plating layer had a composition of Fe/(Ni+Fe)=0.2. Then, gas nitriding was applied to these Ni—P—Fe-plated Ti substrates by placing the substrates in a heat treat furnace and circulating mixed gas of argon (Ar) and ammonia ($NH_3$) to the heat treat furnace (a gas nitriding step). The mixed gas had a composition of 98% by volume of Ar and 2% by volume of $NH_3$, and treatment temperature was 850 deg. C. Three kinds of test specimens 21, 22 and 23 were obtained by changing treatment time to 0.5 hour, one hour, and two hours, respectively.

Furthermore, an Ni—P—Fe plating layer of about 1 μm was formed on a surface of one of the abovementioned Ti substrates by electroless plating using the abovementioned Ni—P—Fe plating solution. This plating layer also had a composition of Fe/(Ni+Fe)=0.2. Then, gas nitriding using an $NH_3$ gas atmosphere was applied to the Ni—P—Fe-plated Ti substrate (a gas nitriding step). This gas nitriding was conducted by placing the substrate in a heat treat furnace and circulating mixed gas of argon (Ar) and ammonia ($NH_3$) to the heat treat furnace. Ar gas flow rate was 200 mL/min, $NH_3$ gas flow rate was 100 mL/min, treatment temperature was 750 deg. C., and treatment time was 1 hour. Thus, a test specimen 31 was obtained.

<Measurement>

Contact resistance before and after immersed in a corrosive solution was measured about each of the abovementioned test specimens. The corrosive solution was prepared by adding 5 ppm $F^-$ and 10 ppm $Cl^-$ to dilute sulfuric acid of pH 4 and holding it at 80 deg. C. Corrosion voltage applied was 0.26 V (vs. Pt) and corrosion test time was 100 hours, at the longest.

Figure 13:
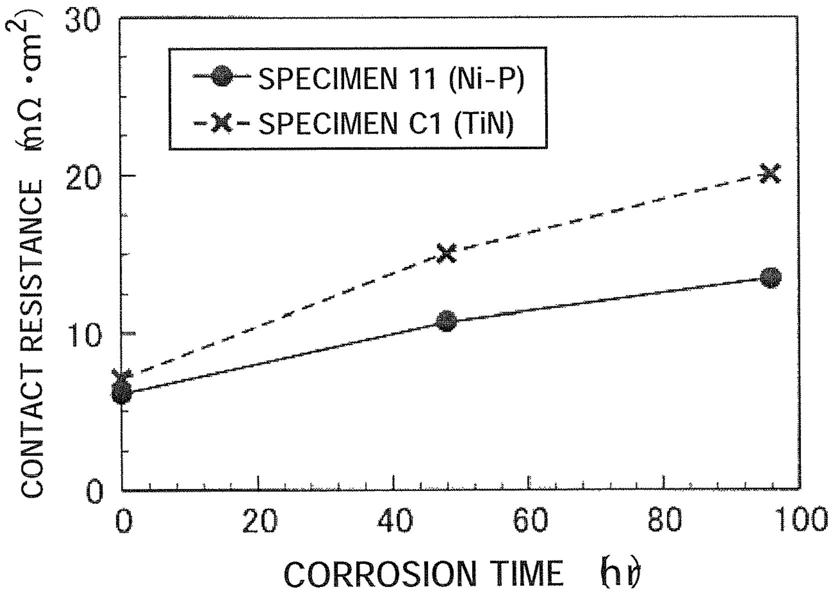
FIG. 13 is a graph showing the relation between corrosion time and contact resistance of test specimens 11 and C1.
Figure 14:
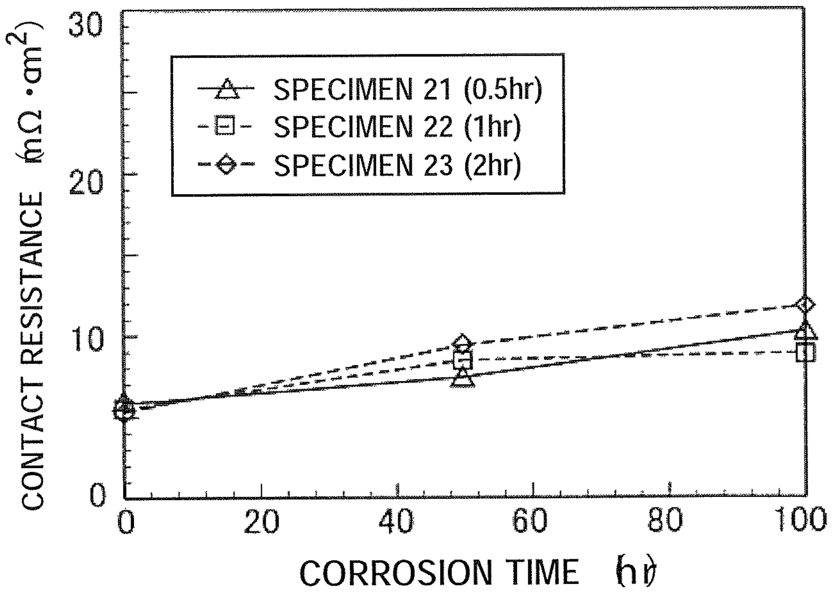
FIG. 14 is a graph showing the relation between corrosion time and contact resistance of test specimens 21 to 23.
Figure 15:
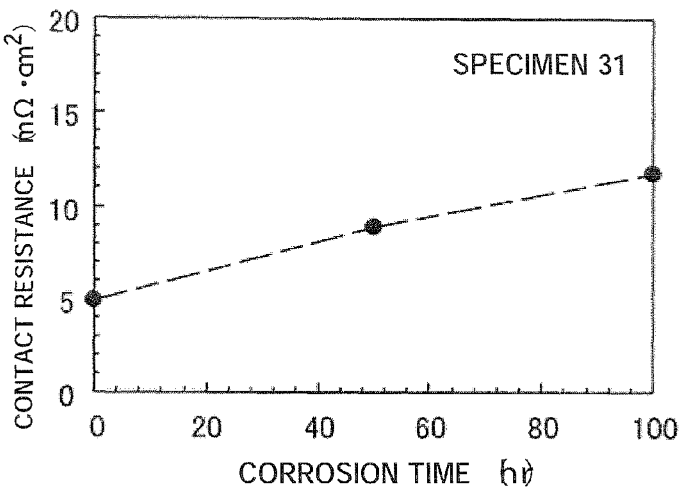
FIG. 15 is a graph showing the relation between corrosion time and contact resistance of a test specimen 31.

Contact resistance was measured by the process shown in FIG. 1. The results are shown in FIGS. 13 to 15. For comparison, a test specimen C1 (comparative example) was prepared by applying an $NH_3$ gas nitriding treatment at 1,000 deg. C. for 2 hours directly to one of the abovementioned Ti substrate. Contact resistance of the test specimen C1 before and after the constant potential corrosion test was also measured. These results are also shown in FIG. 13.

<Evaluation>

As apparent from the respective graphs, the test specimens 11, 12, 21 to 23 and 31 produced by Ni plating had contact resistance of only about 10 m$\Omega$ cm$^2$ even after about 100 hours of the constant potential corrosion test and showed little increase in contact resistance. That is to say, even when nitriding treatment temperature was not more than 850 deg. C., corrosion-resistant conduction films having good corrosion resistance and good conductivity were formed. On the other hand, contact resistance of the Ti—N coated test specimen C1 increased to about 20 m$\Omega$ cm$^2$ after 90 hours.

The test specimens 21 to 23 are samples which were different in treatment time in the gas nitriding step. Even the test specimen 21, which had treatment time of 0.5 hour, showed little increase in contact resistance. The test specimen 31 had an Ni—P—Fe plating layer thickness of 1 μm, which was smaller than thickness of the plating layers of the other test specimens, but had a very small increase in contact resistance caused by corrosion.

E. Fifth Embodiment

<Production of Test Specimens>

(1) A glass substrate (base material) comprising alumina silica glass and a titanium substrate comprising pure titanium (JIS Type 1) were prepared. A film was formed on each of these substrates by pulsed laser deposition (PLD), using two kinds of targets which had different compositions and were produced by spark plasma sintering (SPS).

One of the targets was a Ti—P target produced by mixing TiP powder (10 to 100 μm) and Ti powder (10 to 100 μm) at a ratio of Ti: P=3:1 (namely, $Ti_3P$) and sintering a compact of the mixed powder by SPS. The other of the targets was an Fe—Ti—P target produced by mixing pure Fe powder (10 to 100 μm) and TiP powder (10 to 100 μm) at a ratio of Fe:Ti: P=1:1.58:1 (namely, $FeTi_{1.58}P$) and sintering a compact of the mixed powder by SPS.

It should be noted that the respective powders were mixed by a swing mixer to make uniform mixed powder. SPS was carried out under conditions of applied pressure to mixed powder: 50 MPa, current: up to 2,000 A (maximum value), voltage: up to 15 V (maximum value). The Ti—P target was obtained by sintering at 1,200 deg. C. for 30 minutes, and the Fe—Ti—P target was obtained by sintering at 1,300 deg. C. for 15 minutes.

A thin film was formed on a glass substrate by PLD using each of the targets. Specifically, while a pulsed laser beam having a wavelength of 532 nm was radiated onto each of the targets in a vacuum chamber of $1\times10^{-5}$ Pa, formation of a thin film was continued for one hour. Thus, a test specimen having a thin film of Ti: P=3:1 (a Ti—P film) and a test specimen having a thin film of Fe:Ti:P=1:1.58:1 (a Fe—Ti—P film) were obtained.

(2) In addition, another test specimen was prepared by applying nitriding treatment to the titanium substrate having the abovementioned Ti—P film (a nitriding step). This nitriding treatment was conducted by placing the test specimen in an ammonia gas atmosphere at 850 deg. C. for 2 hours. Hereinafter this film formed on the titanium substrate will be referred to as a Ti—P nitride film for convenience.

<Film Observation>

Thickness of the respective films was calculated from a difference in level from a masked portion. The Ti—P film had a thickness of 160 nm, and the FeTiP film had a thickness of 130 nm. X-ray diffraction did not detect any crystal structure and these films were found to have an amorphous phase.

<Conductivity and Corrosion Resistance>

(1) Volume resistivity of the Ti—P film and the Fe—Ti—P film formed on the glass substrates was measured by four-terminal sensing. Results are shown in Table 5. For reference, volume resistivity of a literature value of carbon is also shown in Table 5. It was confirmed from these results that both the Ti—P film and the Fe—Ti—P according to the present invention had sufficiently smaller volume resistivity than carbon and exhibited as good conductivity as metal.

(2) Corrosion test was carried out on the test specimen produced by forming the Ti—P film on the titanium substrate, the test specimen produced by forming the Fe—Ti—P film on the titanium substrate, and the test specimen produced by forming the Ti—P nitride film on the titanium substrate. Specifically, anode polarization of each test specimen immersed in an aqueous solution of 1 normality (H: 1 mol/L) sulfuric acid (1 $NH_2SO_4$; pH ~O) was measured. Sweep rate was 50 mV/min and a reference electrode used was a saturated silver chloride electrode (SSE: Ag/AgCl/a saturated aqueous KCl solution).

Figure 16:
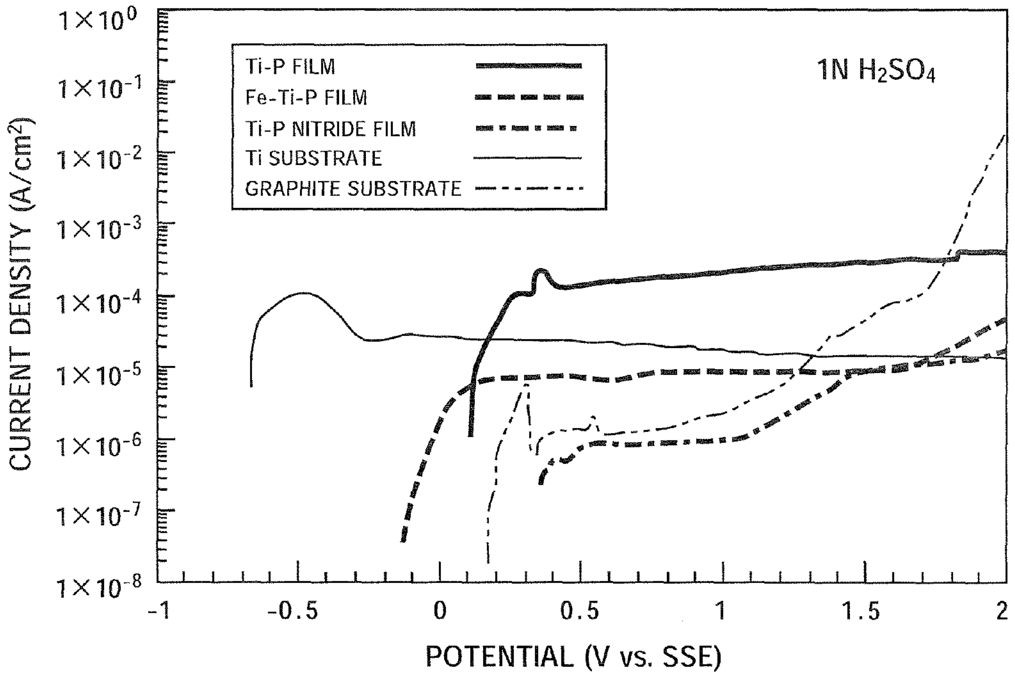
FIG. 16 is a graph showing anode polarization curves of various test specimens according to a fifth embodiment.

For reference, anode polarization of test specimens comprising a titanium substrate or a graphite substrate without any film was similarly measured. Anode polarization curves of the test specimens thus obtained are also shown in FIG. 16.

When an electric potential of about 1 V was applied to the SSE, the test specimen of graphite had an increase in current density and started elusion and passivity broke down. On the other hand, the test specimens having the Ti—P film, the Fe—Ti—P film or the Ti—P nitride film had stable current density even when applied voltage was increased, and it has become apparent that these test specimens exhibit good passivity. It has become apparent that in particular, the Ti—P nitride film formed by nitriding treatment exhibits good corrosion resistance.

F. Polymer Electrolyte Fuel Cell

Figure 17:
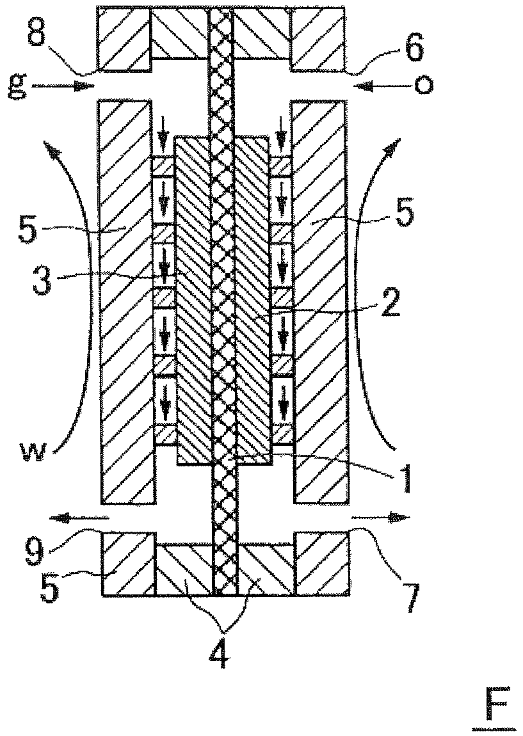
FIG. 17 is a cross sectional view of one unit cell of a polymer electrolyte fuel cell.
Figure 18:
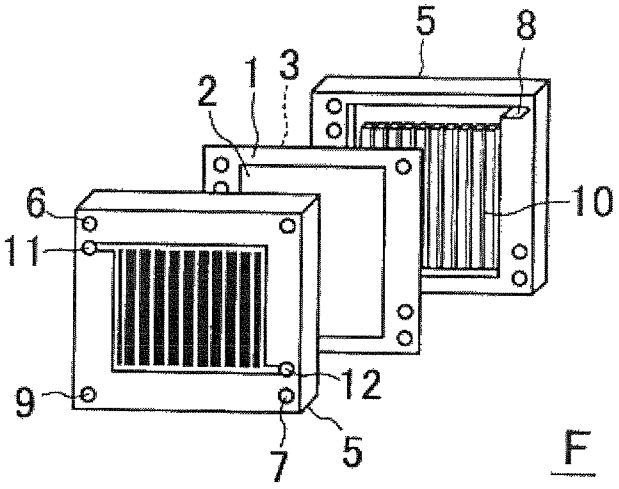
FIG. 18 is an exploded perspective view of one unit cell of a polymer electrolyte fuel cell.

As one embodiment of the conductive film (the corrosion-resistant conduction film) or the conductive material (the corrosion-resistant conduction material) according to the present invention, a polymer electrolyte fuel cell having bipolar plates for a polymer electrolyte fuel cell each having such a film on a surface of a titanium substrate is shown in FIGS. 17 and 18.

A polymer electrolyte fuel cell makes use of the nature that that a solid polymer electrolyte membrane having a proton-exchange group in its molecule serves as a proton-conducting electrolyte. Specifically, as shown in FIGS. 17 and 18, in a polymer electrolyte fuel cell F, an oxidation electrode 2 and a fuel electrode 3 are respectively connected to both sides of a solid polymer electrolyte membrane 1. Furthermore, a pair of bipolar plates 5 are respectively disposed on outer sides of the respective electrodes through gaskets 4. An air inlet port 6 and an air outlet port 7 are provided on the bipolar plate 5 on a side of the oxidation electrode 2, and a hydrogen inlet port 8 and a hydrogen outlet port 9 are provided on the bipolar plate 5 on a side of the fuel electrode 3.

The respective bipolar plates 5 have a plurality of channels 10 extending in a flow direction of hydrogen g and air o in order to ensure passage and uniform distribution of hydrogen g and air o. Moreover, cooling water w fed from a water inlet port 11 circulates the inside of the bipolar plates 5 and then is discharged from a water outlet port 12. This water cooling mechanism stored in the bipolar plates 5 can suppress overheating of the solid polymer electrolyte membrane 1 and so on due to heat generation in generating electric power.

Hydrogen g supplied from the hydrogen inlet port 8 to space between the fuel electrode 3 and the bipolar plate 5 releases an electron and becomes a proton, and passes through the solid polymer electrolyte membrane 1 and reacts with oxygen in the air o which passes through space between the oxidation electrode 2 and the bipolar plate 5 and burns. Then electric power can be supplied to a load between the oxidation electrode 2 and the fuel electrode 3.

Generally, a fuel cell generates very small electric power per cell. Therefore, desired output power (electric energy) is secured by stacking a plurality of unit cells each sandwiched by one pair of bipolar plates 5, 5. When a number of unit cells are stacked, however, contact resistance between the bipolar plates 5 and the respective electrodes 2, 3 becomes great and electric power loss also becomes large, and as a result, power generating efficiency of the polymer electrolyte fuel cell F tends to decrease.

In the present embodiment, since the bipolar plates 5 have a film having good conductivity on a surface layer thereof, corrosion resistance is secured and at the same time, contact resistance between the bipolar plates 5, and the oxidation electrode 2 or the fuel electrode 3 is reduced. Therefore, if the conductive material or the like of the present embodiment is used, it is easy to obtain bipolar plates for a polymer electrolyte fuel cell which have good processability and impact resistance and at the same time have both corrosion resistance and conductivity.

TABLE 1

| TEST | | RAW MATERIAL POWDER | | |
|---|---|---|---|---|
| SPECIMEN | SUBSTRATE | KIND OF POWDER | NITRIDING | REMARKS |
| A1 | PURE Ti | TiP | — | |
| A2 | PURE Ti | $Ti_2P + Ti_3P + Ti_5P_{3.15}$ | — | |
| A3 | PURE Ti | $Ti_2P + Ti_3P + Ti_5P_{3.15}$ | $NH_3$ GAS NITRIDING | |
| A4 | PURE Ti | $Ti_3P + TiN$ | — | |
| B1 | PURE Ti | $Fe_2P + TiN$ | — | |
| B2 | PURE Ti | FeTiP | — | |
| B3 | PURE Ti | FeTiP | $NH_3$ GAS NITRIDING | |
| C1 | PURE Ti | $Ti_2P + Ti_3P + Ti_5P_{3.15}$ | $NH_3$ GAS NITRIDING | SAME AS A3 |
| C2 | STAINLESS STEEL (SUS316L) | $Ti_2P + Ti_3P + Ti_5P_{3.15}$ | $NH_3$ GAS NITRIDING | |
| C3 | STAINLESS STEEL (SUS304) | $Ti_2P + Ti_3P + Ti_5P_{3.15}$ | $NH_3$ GAS NITRIDING | |
| C4 | Al ALLOY (A3003) | $Ti_2P + Ti_3P + Ti_5P_{3.15}$ | $NH_3$ GAS NITRIDING | |

TABLE 2

| OBSERVATION POINT | ANALYTICAL COMPOSITION (atomic %) | | |
|---|---|---|---|
| (Point No.) | Fe | P | Ti |
| 1 | 43.2 | 35.8 | 21.0 |
| 2 | 9.5 | 36.8 | 53.7 |
| 3 | 2.7 | 38.1 | 59.2 |
| 4 | 2.3 | 36.5 | 61.2 |

TABLE 3

| MEASUREMENT | MEASURED VALUE (OBSERVATION POINT: POINT 1) | | STANDARD VALUE OF FePTi | | | |
|---|---|---|---|---|---|---|
| POINT | r (mm) | d (A) | h | k | l | d (A) |
| 1 | 2.95 | 6.84 | 0 | 0 | 1 | 6.897 |
| 2 | 3.34 | 6.04 | 1 | 0 | 0 | 6.007 |
| 3 | 4.49 | 4.49 | 1 | 0 | 1 | 4.530 |
| 4 | 6.79 | 2.97 | 1 | 0 | 2 | 2.991 |
| 5 | 9.47 | 2.13 | 1 | 0 | 3 | 2.147 |

Camera Constant: 20.17(A mm)
Observation Point: Point 1 on the TEM photograph shown in FIG. 6
Measurement Point: Numbers in an electron diffraction pattern in FIG. 7

TABLE 4

| MEASUREMENT | MEASURED VALUE (OBSERVATION POINT: POINT 5) | | STANDARD VALUE OF $Ti_3P$ | | | |
|---|---|---|---|---|---|---|
| POINT | r (mm) | d (A) | h | k | l | d (A) |
| 1 | 5.73 | 3.52 | 2 | 2 | 0 | 3.521 |
| 2 | 7.64 | 2.64 | 3 | −1 | 1 | 2.663 |
| 3 | 11.19 | 1.80 | 5 | 1 | 1 | 1.819 |
| 4 | 15.81 | 1.28 | 7 | 3 | 1 | 1.265 |
| 5 | 21.02 | 0.96 | 9 | 5 | 1 | 0.950 |

Camera Constant: 20.17(A mm)
Observation Point: Point 5 on the TEM photograph shown in FIG. 6
Measurement Point: Numbers in an electron diffraction pattern in FIG. 8

TABLE 5

| | VOLUME RESISTIVITY ($\times 10^{-5}$ Ω m) |
|---|---|
| Ti—P FILM | 1.12 |
| Fe—Ti—P FILM | 1.81 |
| CARBON | 3.5 |

Obviously, many modifications and variations of the present invention are possible in the light of the above teachings. It is therefore to be understood that within the scope of the appended claims, the invention may be practiced otherwise than as specifically described.

What is claimed is:

1. A conductive film, comprising a phosphide particle layer formed by attaching raw material particles to a surface of a substrate material, the raw material particles comprising (i) titanium (Ti) and phosphorus (P) and (ii) including phosphide particles, the phosphide particles (i) ranging from 1 to 100 μm and (ii) comprising a chemical compound of at least one of titanium (Ti) and iron (Fe), and phosphorus (P), wherein the film has concavities and convexities and at least good conductivity, and the phosphide particles comprise FeTiP.

2. The conductive film according to claim 1, wherein the phosphide particle layer is a phosphide particle coated film formed by applying a coating material in which the raw material particles are dispersed in coating fluid to the surface of the substrate material.

3. The conductive film according to claim 1, wherein the phosphide particle layer is a nitrogen-containing phosphide particle layer.

4. The conductive film according to claim 1, wherein the raw material particles contain 3 to 40 atomic % of P with respect to the total number of atoms in the raw material particles.

5. The conductive film according to claim 1, wherein the raw material particles are mixed particles of the phosphide particles and metal particles.

6. The conductive film according to claim 1, wherein at least part of the raw material particles are particles holding nitrogen by containing nitrogen or having nitrogen attached thereto.

7. The conductive film according to claim 1, wherein the raw material particles include nitride particles.

8. The conductive film according to claim 1, wherein the phosphide particles comprise at least one of titanium phosphide expressed by $Ti_xP_z$ and iron phosphide expressed by $Fe_yP_z$ wherein x, y and z are natural numbers.

9. The conductive film according to claim 8, wherein the phosphide particles comprise at least one of TiP, $Ti_2P$, $Ti_3P$, $Ti_5P_3$, and $Fe_2P$.

10. The conductive film according to claim 8, wherein the phosphide particles comprise nitrogen-containing phosphide particles.

11. A corrosion-resistant conduction film, comprising an iron-containing titanium phosphide layer comprising Ti, Fe and P, and formed on a surface of a substrate and exhibiting at least one of good corrosion resistance and good conductivity, the iron-containing titanium phosphide layer having a multilayer structure that includes an outermost surface layer comprising FeTiP and wherein the amount of Fe changes throughout the thickness of the iron-containing titanium phosphide layer.

12. The corrosion-resistant conduction film according to claim 11, wherein the iron-containing titanium phosphide layer contains Fe in an amount satisfying $0$ atomic $\% < Fe < 50$ atomic % with respect to the total number of atoms in the iron-containing titanium phosphide layer.

13. The corrosion-resistant conduction film according to claim 11, further comprising a supporting layer for supporting the iron-containing titanium phosphide layer, the supporting layer comprising $Ti_3P$.

14. The conductive film according to claim 1, wherein the phosphide particles further comprise a titanium phosphide expressed by $Ti_xP_z$, wherein x and z are natural numbers.

15. The conductive film according to claim 1, wherein the phosphide particles further comprise a titanium phosphide expressed by $Ti_xP_z$ and an iron phosphide expressed by $Fe_yP_z$, wherein x, y and z are natural numbers.

16. A conductive film, comprising a phosphide particle layer formed by attaching raw material particles to a surface of a substrate material, the raw material particles comprising (i) titanium (Ti) and phosphorus (P) and (ii) including phosphide particles, the phosphide particles (i) ranging from 1 to 100 μm and (ii) comprising a chemical compound of at least one of titanium (Ti) and iron (Fe), and phosphorus (P), wherein the film has concavities and convexities and at least good conductivity and the phosphide particles comprise a titanium phosphide expressed by $Ti_xP_z$, an iron phosphide expressed by $Fe_yP_z$, and an iron titanium phosphide expressed by $Fe_xTi_yP_z$, wherein x, y and z are natural numbers.

* * * * *